United States Patent
Polishuk et al.

(10) Patent No.: US 10,175,992 B2
(45) Date of Patent: Jan. 8, 2019

(54) SYSTEMS AND METHODS FOR ENHANCING BIOS PERFORMANCE BY ALLEVIATING CODE-SIZE LIMITATIONS

(71) Applicant: Intel Corporation, Santa Clara, CA (US)

(72) Inventors: Leon Polishuk, Haifa (IL); Pavel Konev, Haifa (IL); Larisa Novakovsky, Haifa (IL); Julius Mandelblat, Haifa (IL)

(73) Assignee: Intel Corporation, Santa Clara, CA (US)

( * ) Notice: Subject to any disclaimer, the term of this patent is extended or adjusted under 35 U.S.C. 154(b) by 140 days.

(21) Appl. No.: 15/283,337

(22) Filed: Oct. 1, 2016

(65) Prior Publication Data

US 2018/0095883 A1   Apr. 5, 2018

(51) Int. Cl.
*G06F 9/44* (2018.01)
*G06F 9/4401* (2018.01)
*G06F 12/126* (2016.01)

(52) U.S. Cl.
CPC .......... *G06F 9/4401* (2013.01); *G06F 12/126* (2013.01)

(58) Field of Classification Search
CPC .................. G06F 9/4403; G06F 12/0866
See application file for complete search history.

(56) References Cited

U.S. PATENT DOCUMENTS

| | | | | |
|---|---|---|---|---|
| 5,809,531 A | * | 9/1998 | Brabandt | G06F 9/4403 711/141 |
| 2004/0098575 A1 | * | 5/2004 | Datta | G06F 9/4403 713/2 |
| 2004/0103272 A1 | * | 5/2004 | Zimmer | G06F 9/4403 713/1 |

* cited by examiner

*Primary Examiner* — Albert Wang
(74) *Attorney, Agent, or Firm* — Nicholson De Vos Webster & Elliott, LLP

(57) ABSTRACT

Systems and methods are disclosed for initialization of a processor. Embodiments relate to alleviating any BIOS code size limitation. In one example, a system includes a memory having stored thereon a basic input/output system (BIOS) program comprising a readable code region and a readable and writeable data stack, a circuit coupled to the memory and to: read, during a boot mode and while using a cache as RAM (CAR), at least one datum from each cache line of the data stack, and write at least one byte of each cache line of the data stack to set a state of each cache line of the data stack to modified, enter a no-modified-data-eviction mode to protect modified data from eviction, and to allow eviction and replacement of readable data, and begin reading from the readable code region and executing the BIOS program after entering the no-modified-data-eviction mode.

20 Claims, 24 Drawing Sheets

|  | 63:T | T-1 | 6 | 5 | 4 | P | P-1 | 1 | 0 |
|---|---|---|---|---|---|---|---|---|---|
| WAY-MASK-1 602 | X | 1 | 1 | 1 | 1 | 1 | 0 | 0 | 0 |
| WAY-MASK-2 604 | X | 0 | 0 | 0 | 0 | 0 | 1 | 1 | 1 |
| WAY-MASK-CONTROL '00 = Default; no way mask '01 = Apply way mask 1 '10 = Apply way mask 2 '11 = Do not use in NEM mode 606 | 63:2 = X |||||| '00 |||

Code Region O Cache Ways Read-Only(RO) 608

DataStack P Cache Ways Read/Write (RW) 610

FIG. 6

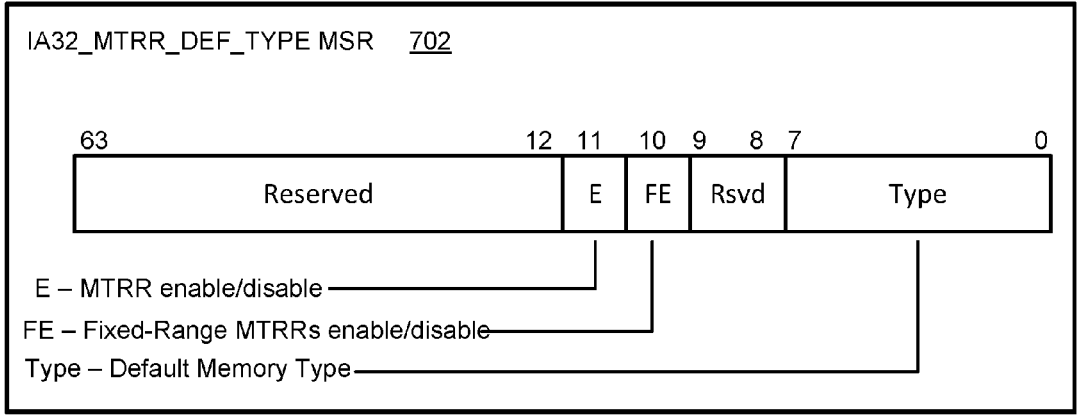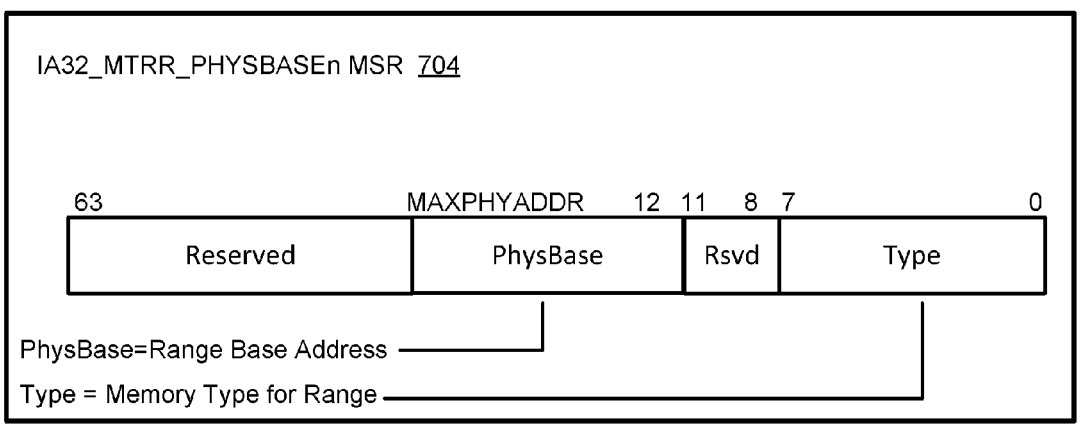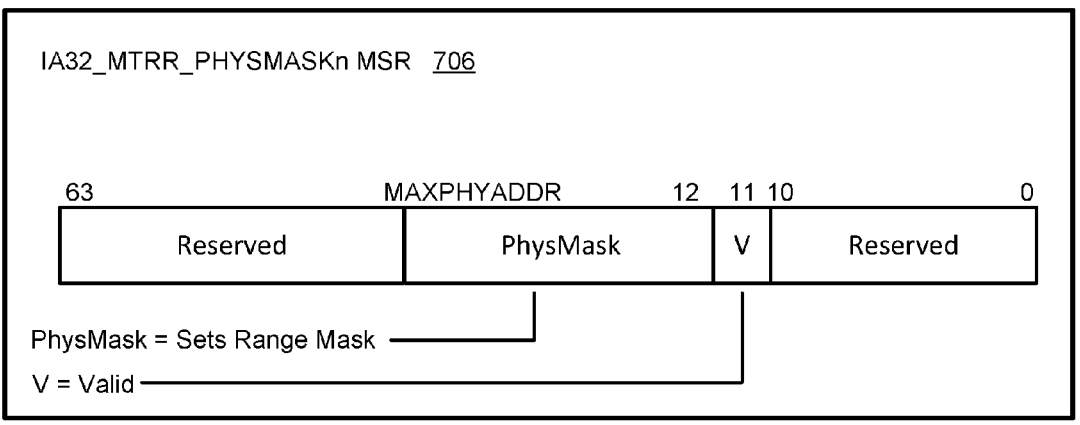
FIG. 7

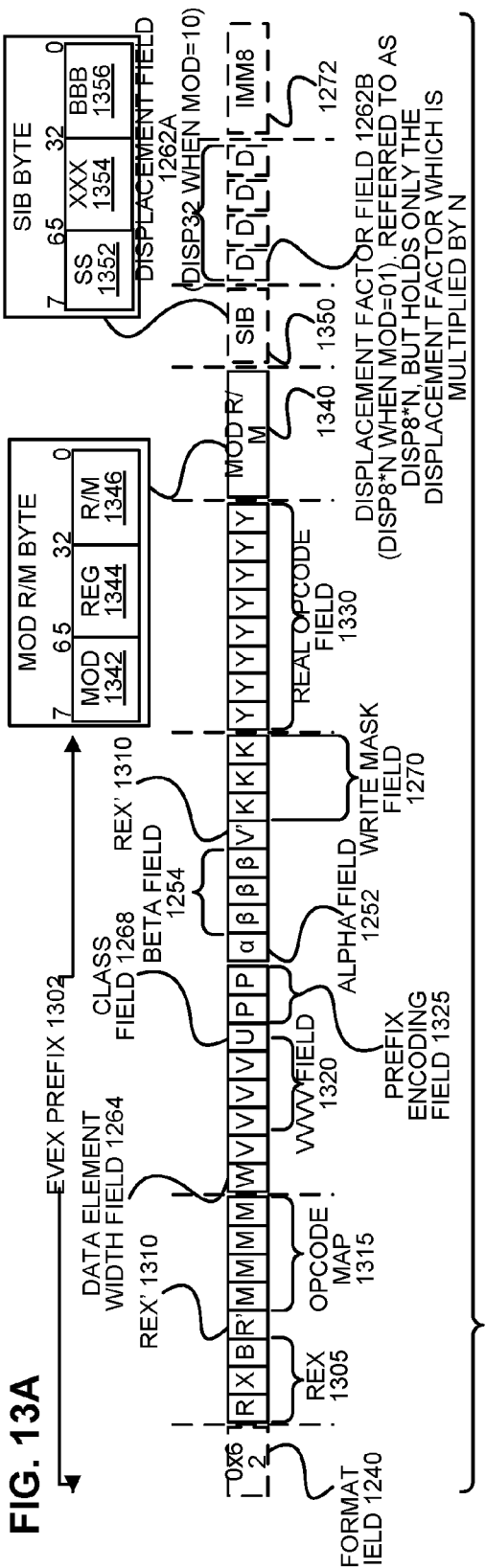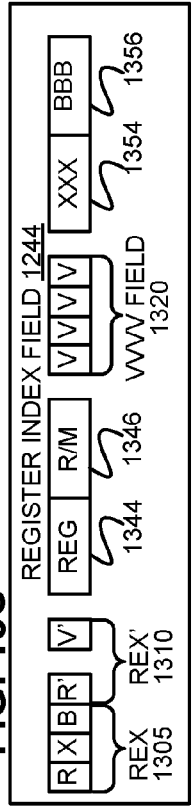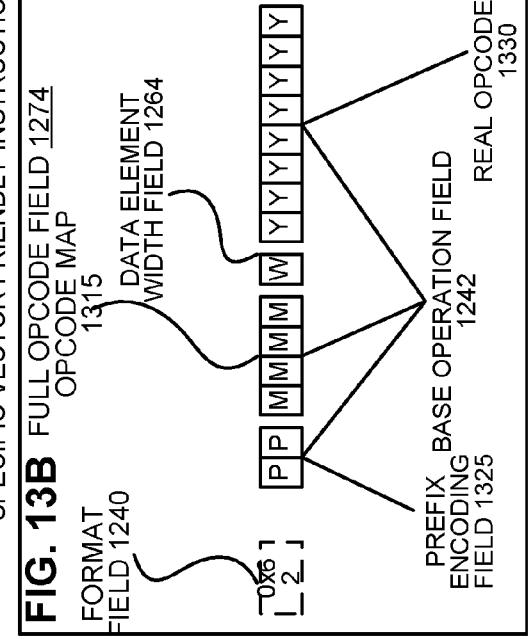

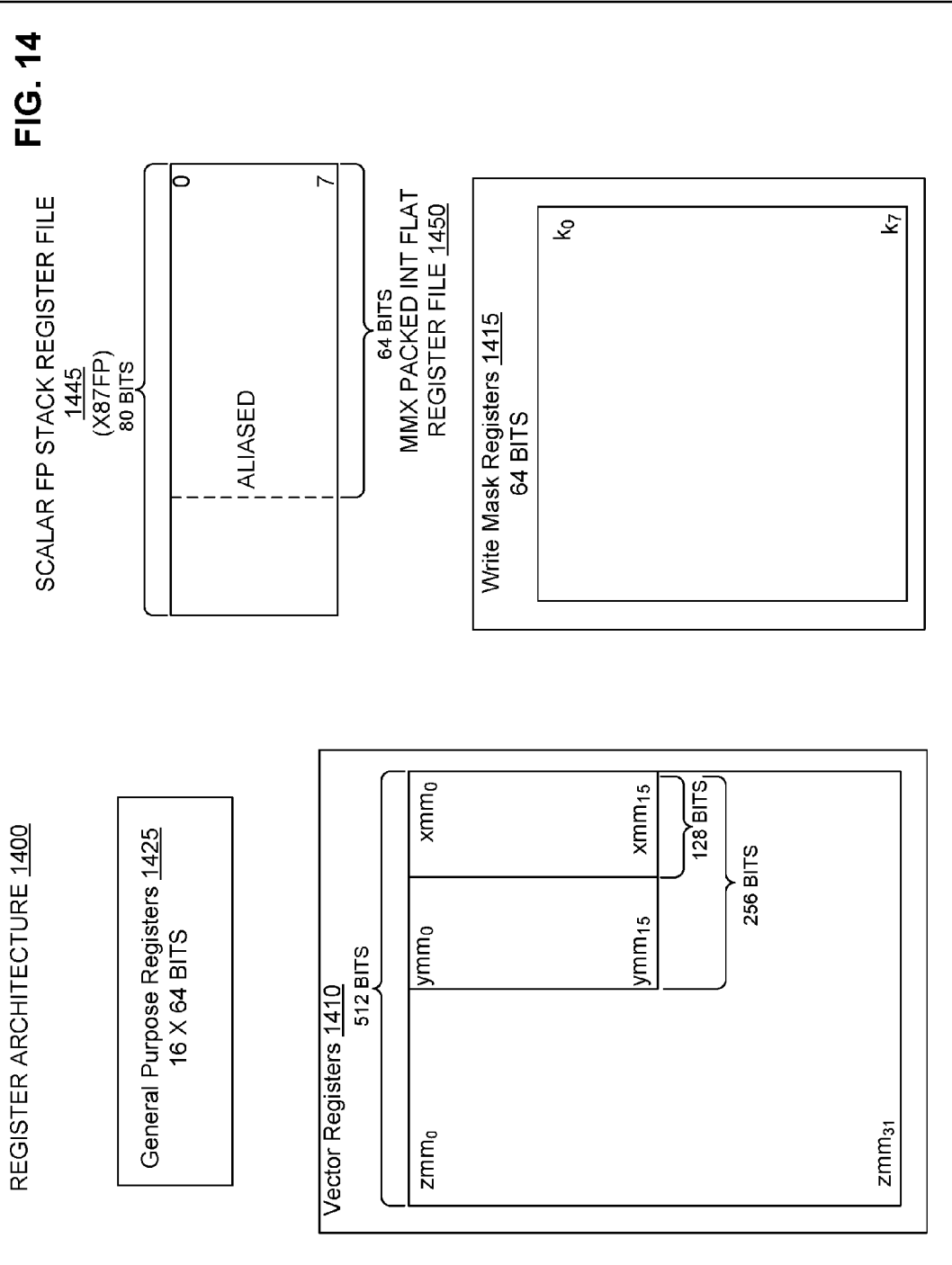

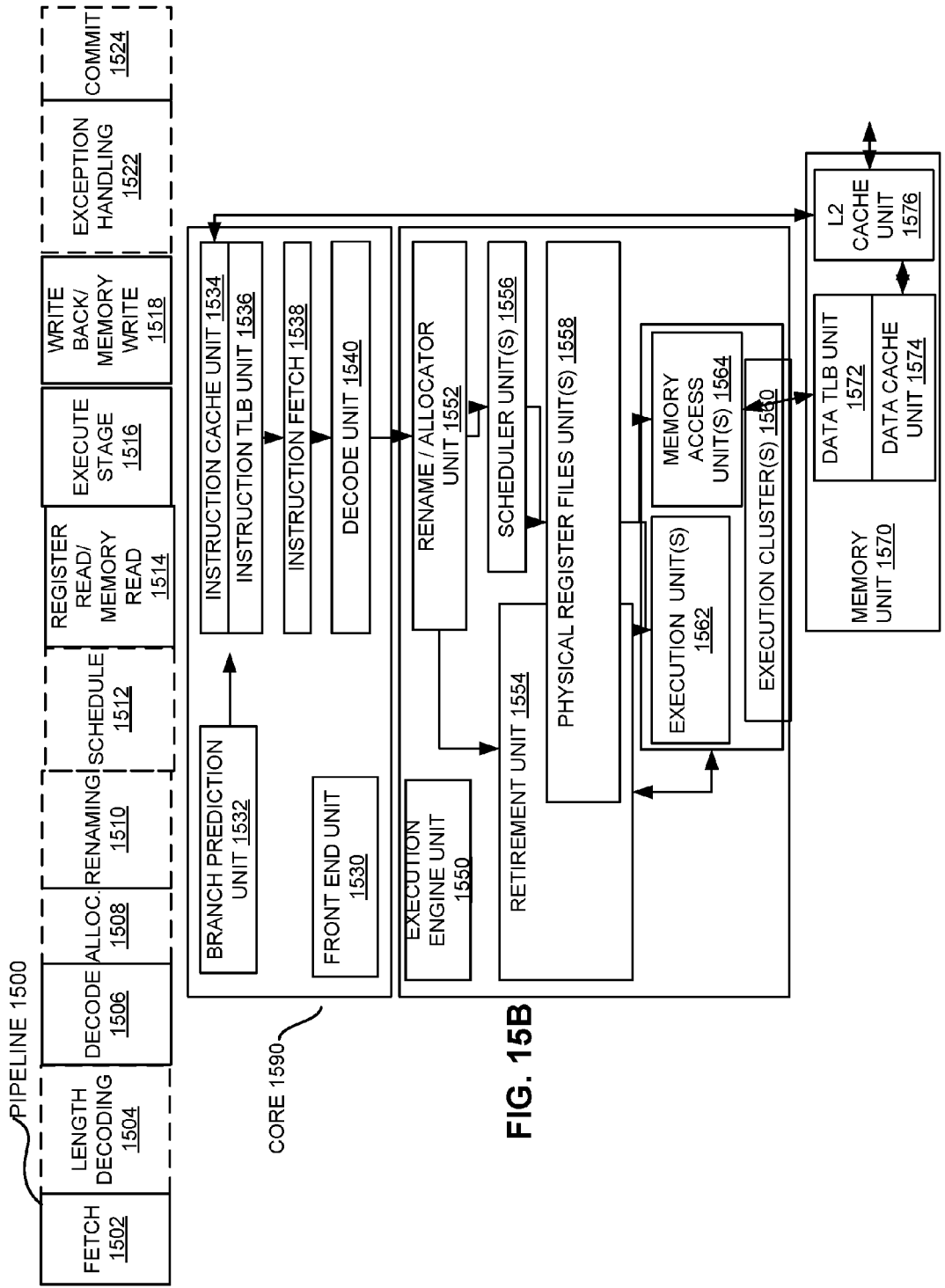

SYSTEMS AND METHODS FOR ENHANCING BIOS PERFORMANCE BY ALLEVIATING CODE-SIZE LIMITATIONS

TECHNICAL FIELD

Embodiments described herein generally relate to initialization of a computer system in a boot mode. In particular, embodiments described generally relate to systems and methods for enhancing BIOS performance by alleviating code size limitation.

BACKGROUND INFORMATION

When a computer system is first powered on, system memory is not yet available. To initialize the computer system, the processor reads and begins executing a Basic Input/Output System (BIOS) program from a non-volatile memory. The processor can use a Cache-as-RAM (CAR) to enable a processor cache to serve as a memory. The BIOS can then load instructions from the non-volatile memory into the CAR, read and execute instructions from the CAR using the processor's instruction fetch, decode, and execute pipeline, read data from the CAR to use as function arguments, and store data results and intermediate values to the CAR.

Using a CAR before system memory is available is challenging because there is nowhere to store cache lines that are evicted, for example by a LRU algorithm. A no-eviction mode (NEM) can be used, but imposes a limitation on the amount of memory that can be used for code and data in order to accommodate smaller processor caches.

BRIEF DESCRIPTION OF THE DRAWINGS

The various advantages of the embodiments disclosed herein will become apparent to one skilled in the art by reading the following specification and appended claims, and by referencing the drawings, in which:

FIG. 6 illustrates model-specific registers (MSRs) for use in enhancing BIOS performance by alleviating code-size limitations according to an embodiment;

FIG. 7 illustrates a variable-sized Memory Type Range Register (MTRR) according to an embodiment;

FIG. 12A is a block diagram illustrating a generic vector friendly instruction format and class A instruction templates thereof according to embodiments of the invention;

FIG. 12B is a block diagram illustrating the generic vector friendly instruction format and class B instruction templates thereof according to embodiments of the invention;

FIG. 13A is a block diagram illustrating an exemplary specific vector friendly instruction format according to embodiments of the invention;

FIG. 13B is a block diagram illustrating the fields of the specific vector friendly instruction format 1300 that make up the full opcode field 1274 according to one embodiment of the invention;

FIG. 13C is a block diagram illustrating the fields of the specific vector friendly instruction format 1300 that make up the register index field 1244 according to one embodiment of the invention;

FIG. 14 is a block diagram of a register architecture 1400 according to one embodiment of the invention;

FIG. 15A is a block diagram illustrating both an exemplary in-order pipeline and an exemplary register renaming, out-of-order issue/execution pipeline according to embodiments of the invention;

FIG. 15B is a block diagram illustrating both an exemplary embodiment of an in-order architecture core and an exemplary register renaming, out-of-order issue/execution architecture core to be included in a processor according to embodiments of the invention;

FIG. 16A is a block diagram of a single processor core, along with its connection to the on-die interconnect network 1602 and with its local subset of the Level 2 (L2) cache 1604, according to embodiments of the invention;

FIG. 16B is an expanded view of part of the processor core in FIG. 16A according to embodiments of the invention;

FIG. 18 shown a block diagram of a system in accordance with one embodiment of the present invention;

FIG. 19 is a block diagram of a first more specific exemplary system in accordance with an embodiment of the present invention;

FIG. 20 is a block diagram of a second more specific exemplary system in accordance with an embodiment of the present invention;

FIG. 21 is a block diagram of a SoC in accordance with an embodiment of the present invention.

DETAILED DESCRIPTION OF THE EMBODIMENTS

Figure 1:
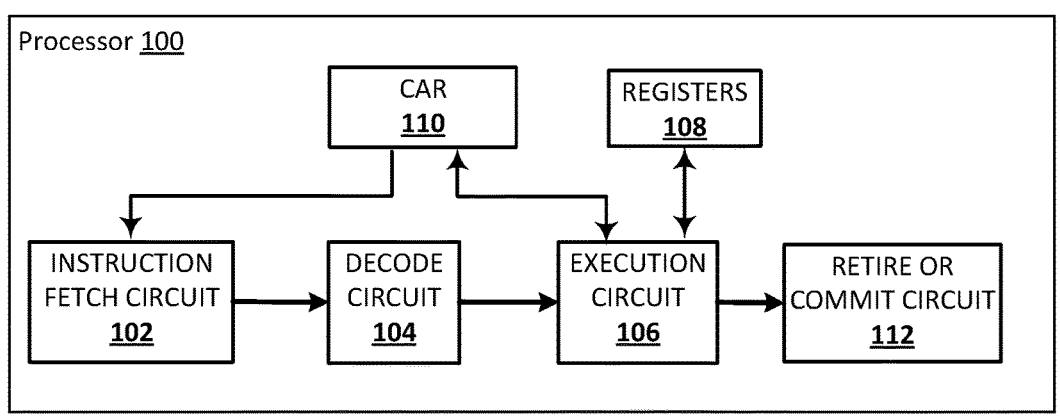
FIG. 1 is an embodiment of a processor for use in enhancing BIOS performance by alleviating code-size limitations.

In the following description, numerous specific details are set forth. However, it is understood that embodiments of the disclosure may be practiced without these specific details. In other instances, well-known circuits, structures and techniques have not been shown in detail to not obscure the understanding of this description.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A BIOS (Basic Input/Output System) is a program that initializes a computer system after power-on. Since system memory is not yet available immediately after power-on, a processor loads the BIOS code into its cache, and used the cache in a Cache-as-RAM (CAR) mode to execute BIOS code. But as system memory has not yet been initialized, cache line evictions requiring a writeback to memory are to be avoided.

A BIOS program includes a code region that holds instructions to be read and executed by a processor. In some embodiments, a processor reads and executes instructions from the code region during a boot mode. A BIOS program also includes a data stack that holds data to be used by the BIOS program. The data stack may hold variables that have an initial, default value, but are modified during execution of the BIOS program instructions.

To accommodate BIOS code and data to be stored in the cache without evictions, some processors place limits on the size of the code region and data stack available for BIOS programs. BIOS writers face a challenge of fitting BIOS code into a small code footprint. If the processor cache is small, or if BIOS writers assume that the cache is small, the challenge of writing BIOS code with a small footprint is greater. The task or programming BIOS code having a small footprint becomes more challenging with new generations of computers and with a growing number of initialization functions to be performed by the BIOS code.

Embodiments disclosed herein offer BIOS writers the advantage of alleviating a code size limitation. Eliminating the code size limitation allows the BIOS writer to optimize the code and make it efficient. The impact of embodiments disclosed herein is particularly beneficial because a BIOS program's data stack is usually small, while the code region is larger, and grows with new generations of processors. Having a code size limitation is detrimental because such a limitation complicates the no-eviction mode (NEM) mode implementation and significantly increases the BIOS run time for products with smaller caches. In one embodiment, a method is disclosed of reading, from a memory having stored thereon a basic input/output system (BIOS) program comprising a readable code region and a readable and writeable data stack; during a boot mode and while using a cache as RAM (CAR), at least one datum from each cache line of the data stack, and writing at least one byte of each cache line of the data stack to set a state of each cache line of the data stack to modified; gentering a no-modified-data-eviction mode to protect modified data in the cache as RAM from eviction, and to allow eviction and replacement of readable data in the cache as RAM; and beginning reading from the readable code region and executing the BIOS program after entering the no-modified-data-eviction mode.

As used herein, boot mode is a processor initialization state that is entered after the processor is powered on. During boot mode, system memory and other system services may not yet be available. Embodiments disclosed herein operate in boot mode, and do not require system memory availability.

FIG. 1 is a block diagram illustrating processing components for executing an instruction according to one embodiment. Specifically, processor 100 includes instruction fetch circuit 102, decode circuit 104, execution circuit 106, registers 108, CAR 110, and retire or commit circuit 112. When the system is powered on and operating with a functional memory hierarchy, instructions can be fetched from system memory. When the system is first powered on, however, instruction fetch circuit 102 fetches instructions from CAR 110, according to a Cache-as-RAM scheme.

After an instruction is fetched from the CAR, decode circuit 104 decodes the instruction. Execution circuit 106 is configured to read data from and write data to registers 108 as well as CAR 110. Registers 108 comprise any one or more of a data register, an instruction register, a general register, and an on-chip memory. CAR 110 comprises any one or more of processor 100 cache memories that are useable after power-on.

Processing components illustrated in FIG. 1 may be included in any of various commercially available processors, including, without limitation, an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Dual microprocessors, multi-core processors, and other multi-processor architectures may also include processor components of FIG. 1. Among other capabilities, the processor components may be configured to fetch and execute computer-readable instructions or processor-accessible instructions stored in a memory or other computer-readable storage media, including a BIOS program stored on a non-volatile memory, as illustrated in FIG. 2.

Figure 2:
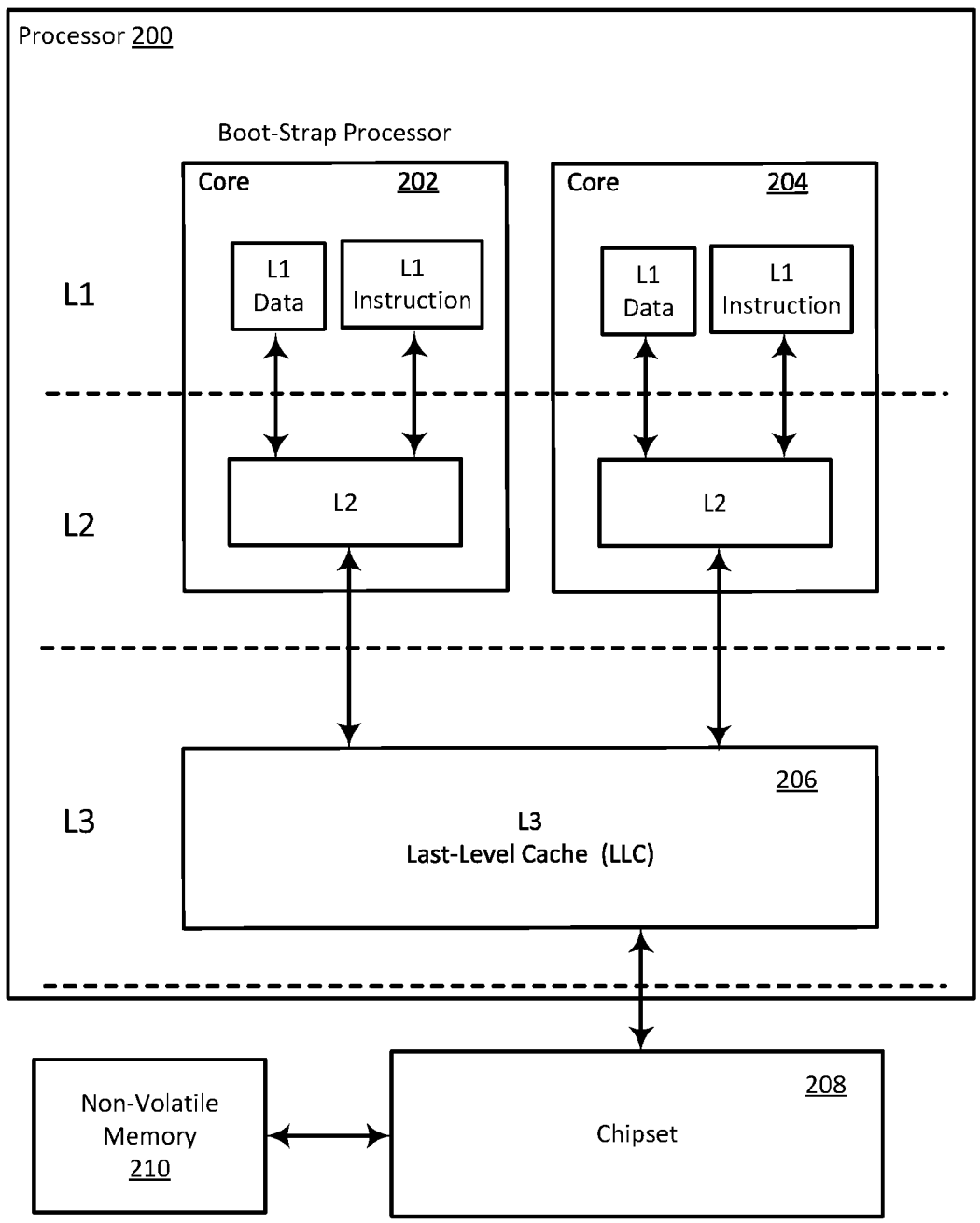
FIG. 2 is an embodiment of a processor having cache memories for use in enhancing BIOS performance by alleviating code-size limitations.

FIG. 2 is block diagram of a processor having cache memories for use in enhancing BIOS performance by alleviating code-size limitations according to an embodiment. Processor 200 includes core 202 and core 204, and L3 Cache 206, also referred to herein as last-level cache (LLC) 206. Core 202 and core 204 each include an L1 data cache, an L1 instruction cache, and an L2 cache. Processor 200 thus includes three levels of caches, each level being illustrated in FIG. 2 by a label and a dashed line. In some embodiments, L1 caches are smaller and faster than L2 caches, which are smaller and faster than L3 caches.

In some embodiments, LLC 206 is partitioned into multiple ways. In some embodiments discussed herein, LLC 206 is partitioned into T ways, of which a first number of ways are for storing read/write (RW) data, and a second number of ways are for storing readable data. Further embodiments of cache ways are illustrated and described below with respect to FIG. 3 and FIG. 4.

Core 202 in this embodiment is the designated Boot-Strap Processor (BSP), and will perform the boot sequence to execute the BIOS program. The boot sequence as described herein is a processor state entered after power-on, and before system memory is available. As described further below, Boot-Strap Processor 202 uses LLC 206 in a Cache-as-RAM (CAR) mode while executing the BIOS code.

The remaining logical processors (RLPs), including core 204, may remain in an IDLE state awaiting completion of the boot sequence by core 202, or they may perform other tasks.

FIG. 2 also shows chipset 208 and non-volatile memory 210, both of which are coupled to processor 200. In embodiments disclosed herein, non-volatile memory 210 is to store a BIOS program to be loaded and executed by processor 200 as part of the boot sequence. Non-volatile memory 210 may be selected from any one of a ROM, a PROM, an EPROM, an EEPROM, and a flash memory. Additional embodiments of non-volatile memory 210 may be used, without limitation.

A benefit of embodiments disclosed herein is that the BIOS code region size is not limited by the size of any of the caches at levels L1, L2, or L3. As described further below, embodiments disclosed herein load BIOS code into readable ways of a cache, and evict code and replace it with new code without limitation. The BIOS code region size in disclosed embodiments is therefore not limited by the size of any of the L1, L2, or L3 caches.

Figure 3:
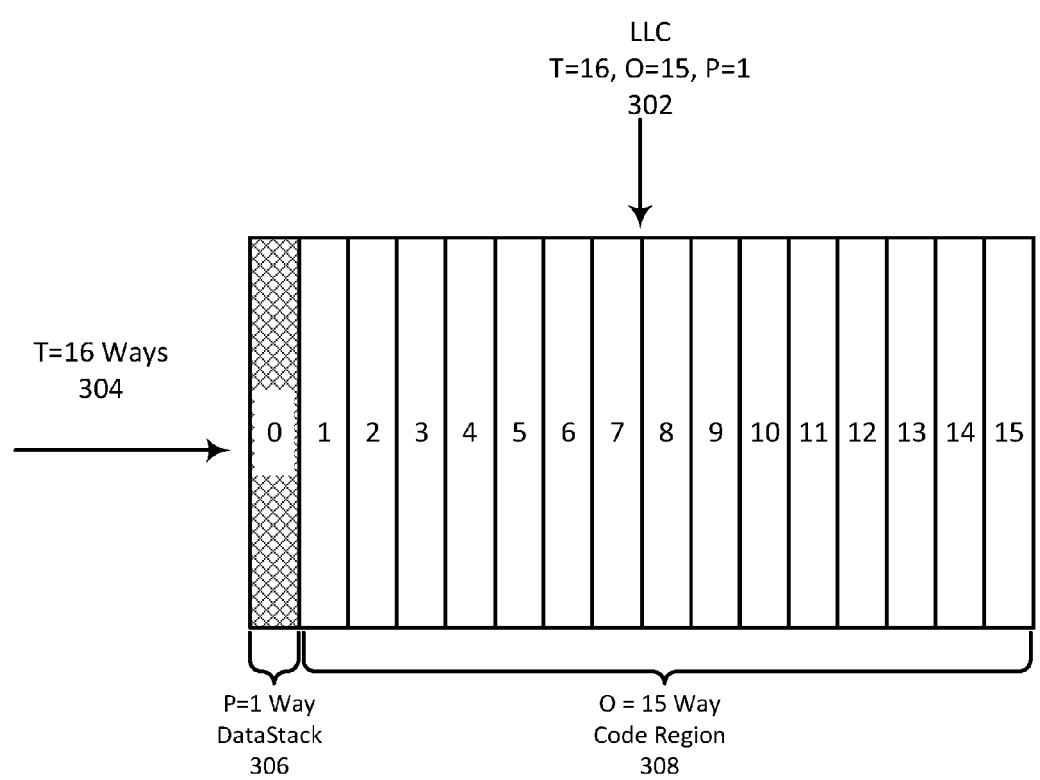
FIG. 3 is a diagram of a cache memory partitioned into readable ways and read/writeable ways according to an embodiment.

FIG. 3 is a block diagram of a cache memory partitioned into a first set of read/write ways and a second set of readable ways according to an embodiment. Here, LLC 302 is a last-level cache (LLC) partitioned into T=16 ways 304, of which 306 is a data stack including a first number of ways having P ways, where P=1, to store RW data, and 308 is a code region including a second set of readable ways having O ways, where O=15, to store readable code and data, including BIOS program instructions, such as instructions loaded from non-volatile memory 210 (FIG. 2).

In the embodiment of FIG. 3, a first number of ways includes one way of the LLC that is allocated for RW Data, while the remaining 15 ways in a second number of ways are readable and are used for Code. The BIOS data stack size is limited by the size of the 1 way, while the BIOS code region size is not limited because, as described further below, cache lines containing readable code are allowed to be evicted and replaced without limit.

In some embodiments, LLC 302 is partitioning dynamically as part of the boot sequence. In other embodiments, LLC 302 is partitioned beforehand.

Figure 4:
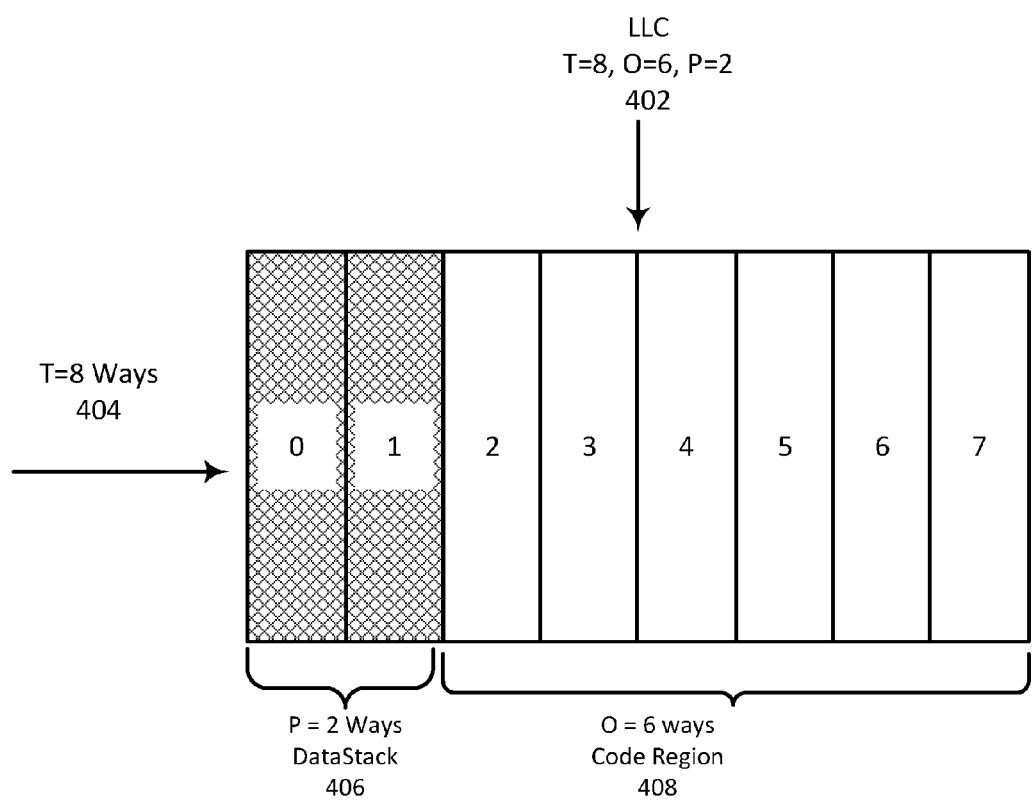
FIG. 4 is a diagram of a cache memory partitioned into readable ways and read/writeable ways according to an embodiment.

FIG. 4 is a block diagram of a cache memory partitioned into readable ways and read/writeable ways according to an embodiment. Here, cache 402 is a last-level cache (LLC) partitioned into T=8 ways 404, of which 406 is a data stack including a first number of ways includes 2 ways (P=2 ways) to store RW data, and 408 is a code region including a second number of ways including 6 ways (O=6 ways) to store readable code and data, including BIOS program instructions, such as instructions loaded from non-volatile memory 210 (FIG. 2).

In the embodiment of FIG. 4, two ways of the LLC are allocated for RW Data, while the remaining 6 ways are used for Code. The BIOS data stack size is limited by the size of the 2 ways, while the BIOS code region size is not limited because, as described further below, cache lines containing readable code are allowed to be evicted and replaced without limit.

In some embodiments, the readable and read/write partitioning of the cache is implemented using circuitry outside the cache. For example, read/writeable cache lines can be directed to the read/writeable cache ways, while readable cache lines can be directed to the readable ways.

Figure 5:
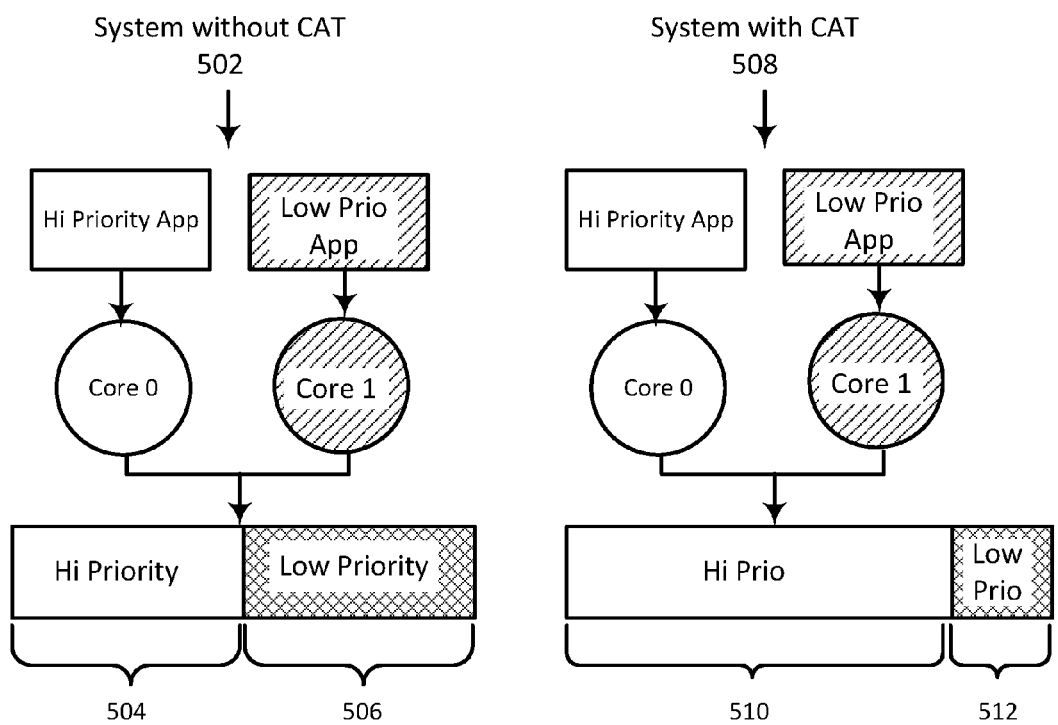
FIG. 5 is a diagram of a cache memory partitioned into readable ways and read/writeable ways according to an embodiment.

FIG. 5 illustrates a Cache Allocation Technology (CAT) that is supported in some processors. As shown, a system 502 without CAT does not allocate more cache resources to high-priority applications. In system 502, the same amount of cache resources 504 are allocated to high-priority applications as the amount 506 allocated to low-priority applications. Cache Allocation Technology supported by some processors enables resource allocation on a per-application basis, per-thread basis, or per-processor core basis. Some processors support CAT cache partitioning for multiple cache levels, including for example Level 2 and Level 3 caches. Some embodiments disclosed herein repurpose CAT for use in allocating a first number of ways of a cache to read/write data and a second number of ways of the cache to readable data.

FIG. 6 illustrates model-specific registers (MSRs) for use in enhancing BIOS performance by alleviating code-size limitations according to some embodiments. A model-specific register (MSR) is any of various software accessible control registers in a processor's instruction set or architectural register file that can be used to control certain CPU features. Some processors allow reading and writing to these registers using RDMSR and WRMSR instructions. Documentation regarding which MSRs a certain processor supports is usually found in the processor documentation of the CPU vendor. Some processors have a predefined set of MSRs.

Embodiments disclosed herein make use of three MSRs, as illustrated in FIG. 6. Way-mask-1 602 and way-mask-2 604 each contain 1 bit per cache way. If the bit is equal to '0,' the way is protected from eviction. If the bit is equal to '1,' the way is not protected from eviction. Conversely, when a cache line is read into the cache from the non-volatile memory, it will be placed in a way having a mask bit equal to '1.' In other words, cache ways having a mask-bit equal to '0' are protected from eviction, which would be required if a new cache line were to replace an existing cache line.

As illustrated, the total number of ways is T and the total number of ways to be protected from eviction is P. Way_mask_control 606 indicates which way-mask should be applied for a specific request while the processor uses the Cache-as-RAM (CAR) to execute BIOS program code in no-eviction mode (NEM). Way_mask_control 606 has 2 bits. In some embodiments, the default value for way_mask_control 606 is 2'b00, indicating that no way mask should be applied, 2'b01 indicating that way-mask-1 should be applied, 2'b10 indicating that way-mask-2 should be applied, and 2'b11 is not to be used in NEM mode. Upon the end of the NEM mode boot sequence, the default value, 2'b00, of way_mask_control 606 is restored.

In operation, according to some embodiments, as an initial step in performing BIOS program code in NEM mode, the processor reads a DWORD from every cache line of the BIOS data stack in order to bring all of the data stack into the cache. In so doing, way_mask_control 606 will be set to 2'b10, meaning that way-mask2 604 should be used, meaning that incoming cache lines will be stored in one of the first number of ways, and that no incoming cache lines will be stored in any of the second number of ways.

In operation, according to some embodiments, while the processor executes BIOS program code using the Cache-as-RAM (CAR) in NEM mode, way_mask_control 606 is set to 2'b01, indicating that way-mask-1 602 should be used to protect the P cache ways that hold RW data from eviction, but to allow cache lines in the O cache ways that hold code and readable data to be freely evicted and replaced, for example to load new BIOS instructions for execution.

FIG. 7 illustrates a Memory Type Range Register (MTRR) according to an embodiment. In one embodiment, memory ranges and the types of memory specified in each range are set by three groups of registers: the IA32_MTRR_DEF_TYPE MSR, the fixed-range MTRRs, and the variable range MTRRs. These registers can be read and written to using the RDMSR and WRMSR instructions, respectively. The IA32_MTRRCAP MSR indicates the availability of these registers on the processor.

In at least one embodiment of a processor, IA32_MTRR_DEF_TYPE MSR 702 sets the default properties of the regions of physical memory that are not encompassed by MTRRs. The functions of the flags and field in this register are as follows: Type field, bits 0 through 7, indicates the default memory type used for those physical memory address ranges that do not have a memory type specified for them by an MTRR.

At least one processor embodiment permits software to specify the memory type for "m" variable size address ranges, using a pair of MTRRs for each range. The first entry in each pair, here, IA32_MTRR_PHYSBASEn MSR 794, defines the base address and memory type for the range; the second entry in each pair, here, IA32_MTRR_PHYSMASKn MSR 706) contains a mask used to determine the address range. The "n" suffix is in the range 0 through m−1 and identifies a specific register pair.

Figure 8:
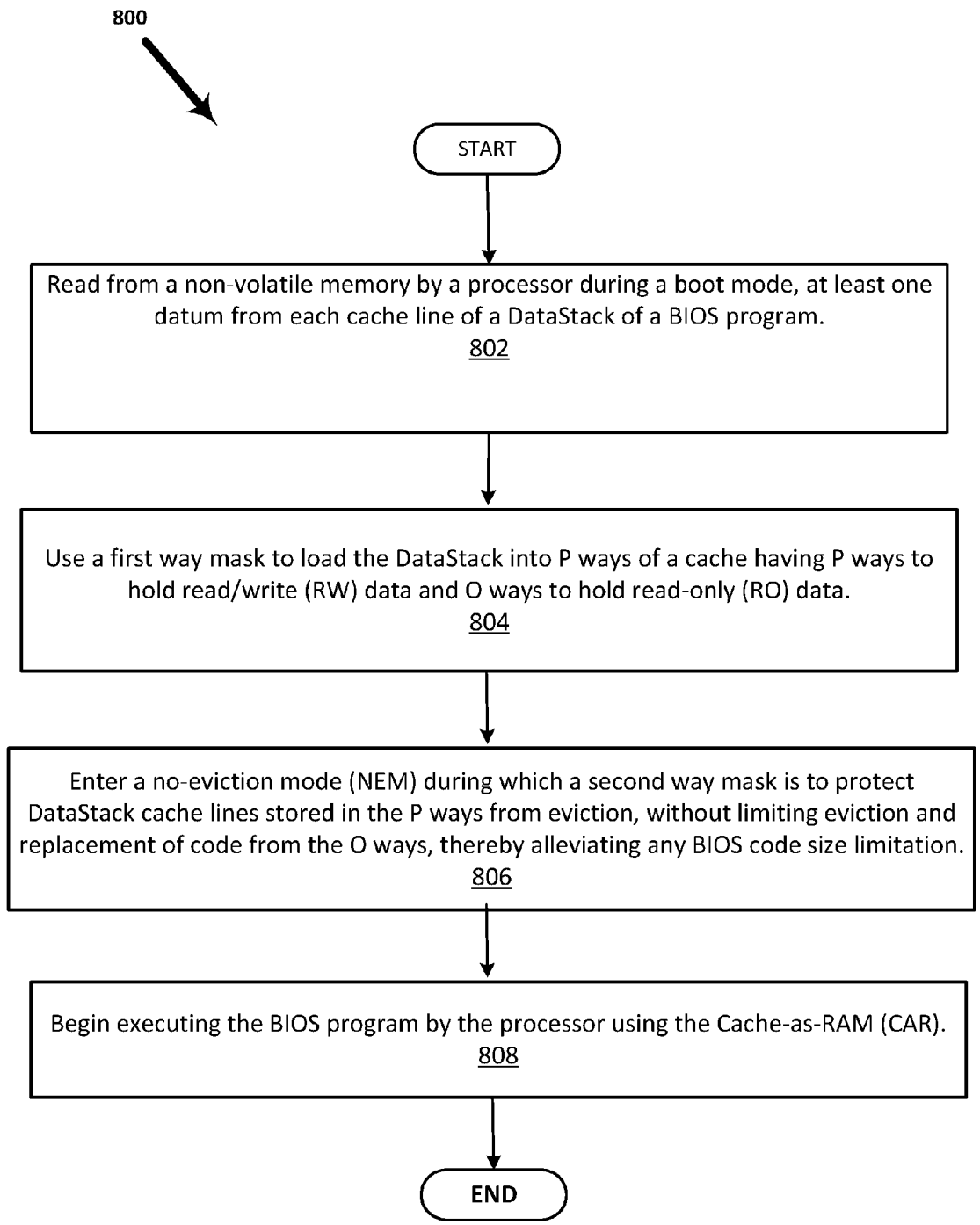
FIG. 8 is a flow diagram of a processor to executing a BIOS program in a NEM mode using the Cache-as-RAM according to an embodiment.

FIG. 8 is an embodiment of a method of a processor executing a BIOS program in a NEM mode using the Cache-as-RAM. At 802, a processor is to read from a non-volatile memory by a processor during a boot mode, at least one datum from each cache line of a data stack of a BIOS program. At 804, the processor is to use a first way mask to load the data stack into a first number of ways of a cache having a first number of ways to hold read/write (RW) data and a second number of ways to hold readable data. At 896, the processor is to enter a no-eviction mode (NEM) during which a second way mask is to protect data stack cache lines stored in the a first number of ways from eviction, without limiting eviction and replacement of code from the second number of ways, thereby alleviating any BIOS code size limitation. At 808, the processor begins executing the BIOS program using the Cache-as-RAM (CAR).

Figure 9:
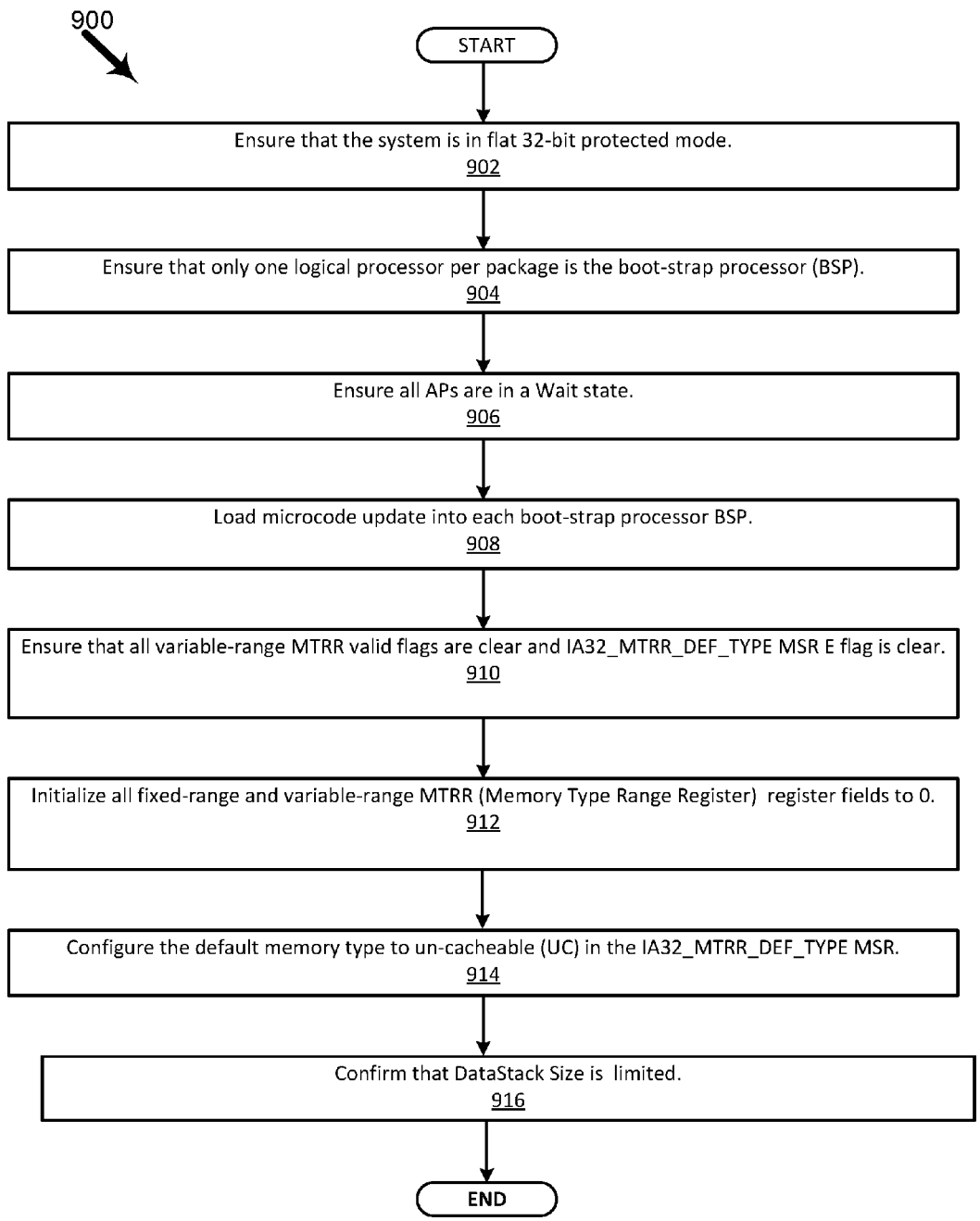
FIG. 9 is a flow diagram for a method of initializing a processor to execute a BIOS program in a NEM mode using the Cache-as-RAM according to an embodiment.

FIG. 9 is an embodiment of method enabling a processor to execute a BIOS program in a NEM mode using the Cache-as-RAM. At 902, the processor is to ensure that the system is in flat 32-bit protected mode. To do so, the processor performs various software routines to check processor state and conditions. If such a check should fail, the processor can raise an exception or otherwise give notice of a failure. At 904, the processor is to ensure that only one logical processor per package is the boot-strap processor (BSP). At 906, the processor is to ensure all other cores and application processors are in a Wait, for example a Wait-for-SIPI state used supported by some application processors in a multi-processor environment. At 908, the processor is to load a microcode update into each boot-strap processor BSP. At 910, the processor is to ensure that all variable-range Memory Type Range Register (MTRRs) valid flags are clear and IA32_MTRR_DEF_TYPE MSR E flag is clear. At 912, the processor initializes all fixed-range and variable-range Memory Type Range Register (MTRRs) fields to 0 (MTRRs are discussed further below). At 914, the processor configures the default memory type to un-cacheable (UC) in the IA32_MTRR_DEF_TYPE MSR. At 916, the processor confirms that the data stack is limited, for example by determining the size of the data stack on the non-volatile memory that stores the BIOS program.

It is to be understood that not all of the steps of FIG. 9 are necessarily to be performed in order to use embodiments disclosed herein. Some of the steps of FIG. 9 may have been performed in the past, and need not be repeated. Some of the steps in FIG. 9 may be skipped, or performed if a need should arise.

Figure 10:
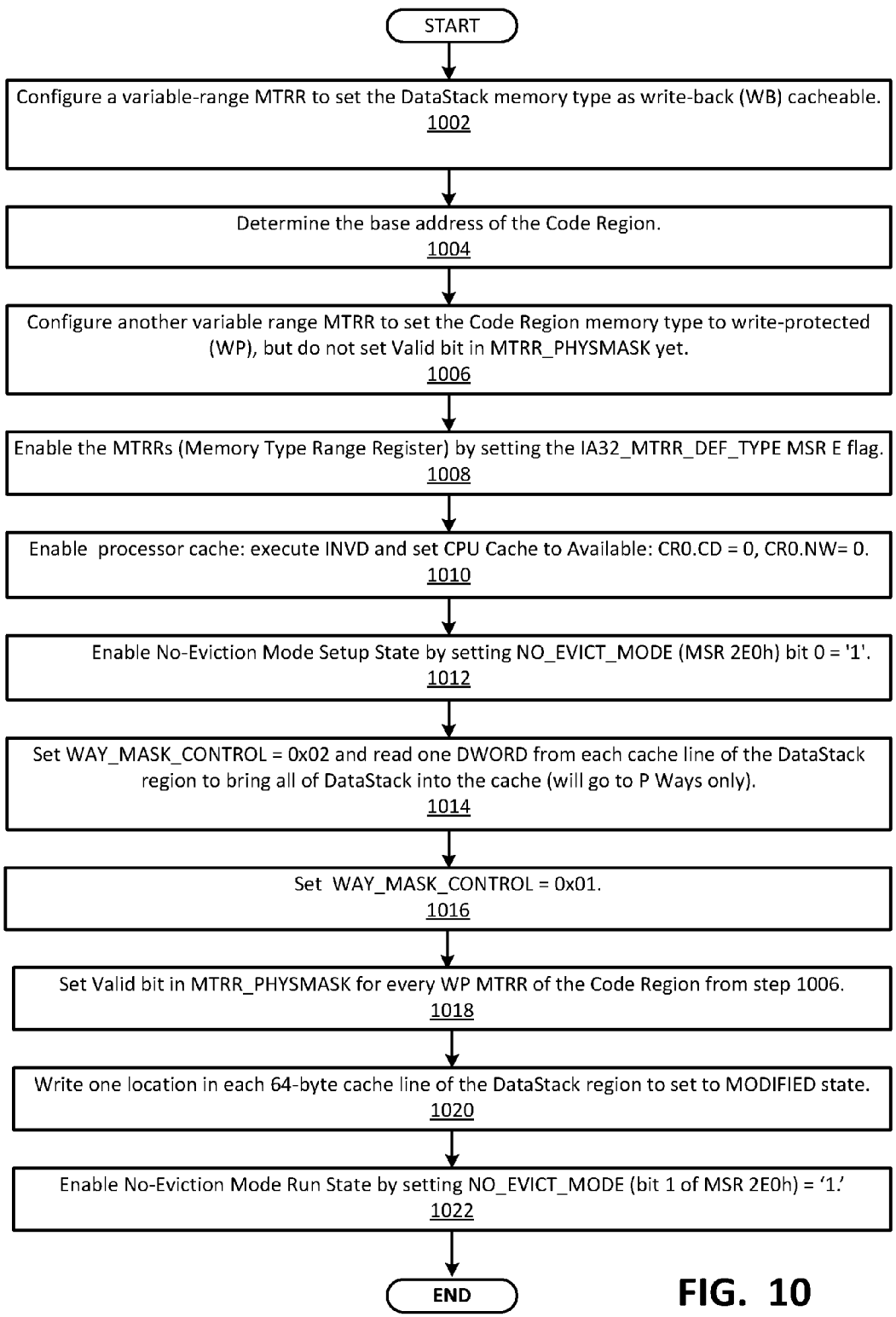
FIG. 10 is a flow diagram for a method of enabling a processor to execute a BIOS program in a NEM mode using the Cache-as-RAM according to an embodiment.

FIG. 10 is an embodiment of a method to execute a BIOS program in a NEM mode using the Cache-as-RAM. At 1002, the processor is to configure the data stack as write-back (WB) cacheable memory type using the variable range MTRRs. Cache lines designated as WB cacheable memory are fetched from memory on a cache miss. At 1004, the processor is to determine the base address of the Code Region. At 1006, the processor is to configure the Code Region as write-protected (WP) cacheable memory type using the variable range MTRRs, but does not yet set the Valid bit in MTRR_PHYSMASK yet. Cache lines designated as WP cacheable memory are cacheable, but will not be modified by a cache write. By not setting the "valid" we don't enable this MTRR. This way the code that is performed after this step is still uncacheable. At 1008, the processor is to enable the MTRRs (Memory Type Range Register) by setting the IA32_MTRR_DEF_TYPE MSR E flag. At 1010, the processor is to enable the logical processor's (BSP) cache: execute INVD and set CPU Cache Available, for example by setting CR0.CD=0, CR0.NW=0, as described in some processors' Software Development Manuals. At 1012, the processor is to enable No-Eviction Mode Setup State by setting NO_EVICT_MODE (MSR 2E0h) bit 0='1.' At 1014, the processor is to set WAY_MASK_CONTROL=0x02 and read one DWORD from each cache line of the data stack to bring the data stack into the cache (will go to the first number of ways only). At 1014, way_mask_2 is used to control loading RW data is the first number of ways of the cache. At 1016, the processor is to set WAY_MASK_CONTROL=0x01, so as to enable way_mask_1 to cause the first number of ways (P ways) to be protected from eviction, while allowing cache lines stored in the second number of ways to be freely evicted and replaced, for example by new BIOS program instructions. At 1018, the processor is to set the Valid bit in MTRR_PHYSMASK for every WP MTRR of the Code Region from step 1006. At 1020, one location in each 64-byte cache line of the Data stack region is written to set to the cache line to MODIFIED state. At 1022, a No-Eviction Mode Run State is enabled by setting NO_EVICT_MODE (bit 1 of MSR 2E0h)='1.' From this point on, the read/write data in the first number of ways have a MODIFIED state and are protected from eviction, while the code stored in the second number of ways becomes cacheable and is loaded in the cache in the second number of ways that are not protected from eviction. The cache is therefore in a "no-modified-data-eviction mode." The initialization method then ends and the processor can execute the BIOS program in NEM mode using Cache-as-RAM (CAR)

Figure 11:
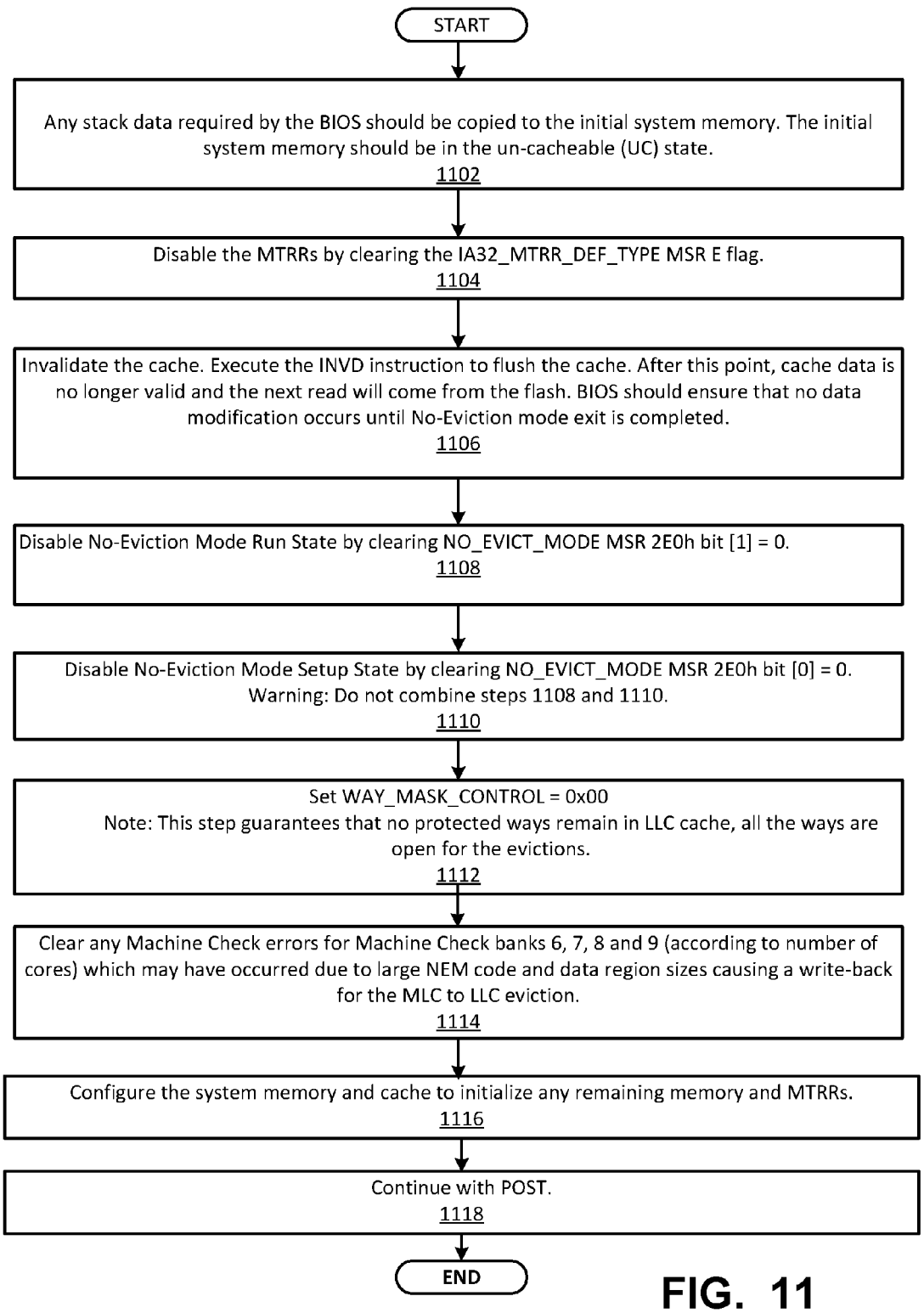
FIG. 11 is a flow diagram for a method of shutting down a No-Eviction Mode state according to an embodiment.

FIG. 11 is an embodiment of method of shutting down a No-Eviction Mode state according to an embodiment. The method can be performed, for example, by a boot-strap processor upon completion of executing the BIOS program.

In some embodiments, at 1102, the processor is to copy any stack data required by the BIOS after the boot sequence is completed should be copied to the initial system memory. In some embodiments, the initial system memory is to be in the un-cacheable (UC) state. In some embodiments, at 1104, the processor is to Disable the MTRRs by clearing the IA32_MTRR_DEF_TYPE MSR E flag. In some embodiments, at 1106, the processor is to Invalidate the cache. In some embodiments, the processor is to execute the INVD instruction to flush the cache. After this point, in some embodiments, cache data is no longer valid and the processor ensures that no data modification occurs until No-Eviction mode exit is completed. In some embodiments, at 1108, the processor disables No-Eviction Mode Run State by clearing NO_EVICT_MODE MSR 2E0h bit [1]=0. Alternatively, in some embodiments, at 1110, the processor is to Disable No-Eviction Mode Setup State by clearing NO_EVICT_MODE MSR 2E0h bit [0]=0. It is to be understood that one or the other of 1108 or 1110 is to be performed by the processor, not both. In some embodiments, at 1112, the processor is to Set WAY_MASK_CONTROL=0x00, the default setting. By so doing, the processor ensures that no protected ways remain in the LLC cache; all the ways are allowed to be evicted. At 1114, in some embodiments, the processor is to clear any machine check errors for machine check banks 6, 7, 8 and 9 (according to number of cores) which may have occurred due to large NEM code and data region sizes causing a write-back for the MLC to LLC eviction. In some embodiments, at 1116, the processor is to configure the system memory and cache to initialize any remaining memory and MTRRs. At 1118, the processor is to continue with power-on self-test (POST).

It is to be understood that not all the steps illustrated in FIG. 11 need necessarily be performed to shut down an NEM mode boot sequence. The illustrated steps may be different when executed on a different processor. In addition, some processors may allow additional shut-down steps. Some processors may all fewer shut-down steps.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 12A:
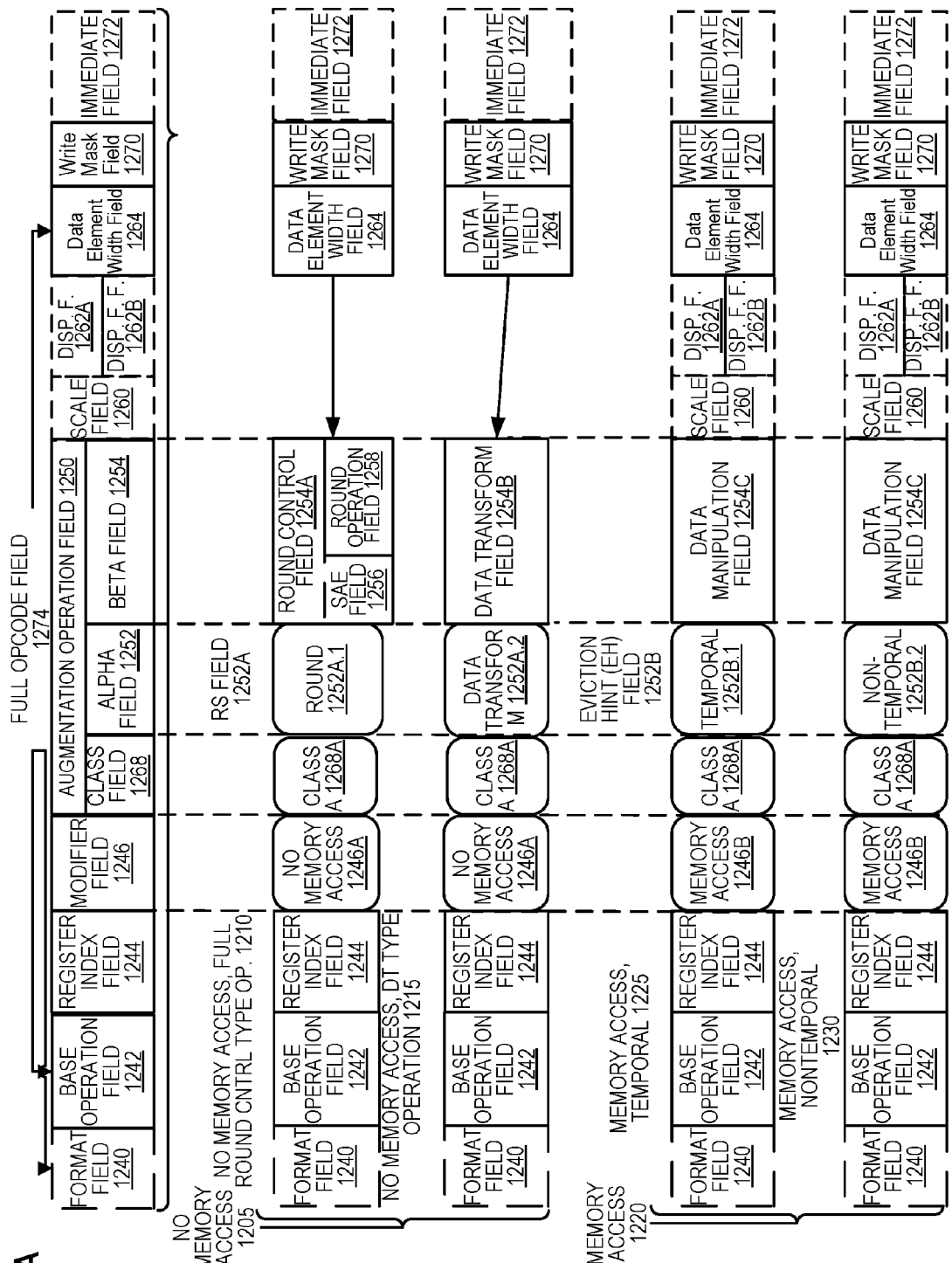
FIGS. 12A-12B are block diagrams illustrating a generic vector friendly instruction format and instruction templates thereof according to embodiments of the invention.
Figure 12B:
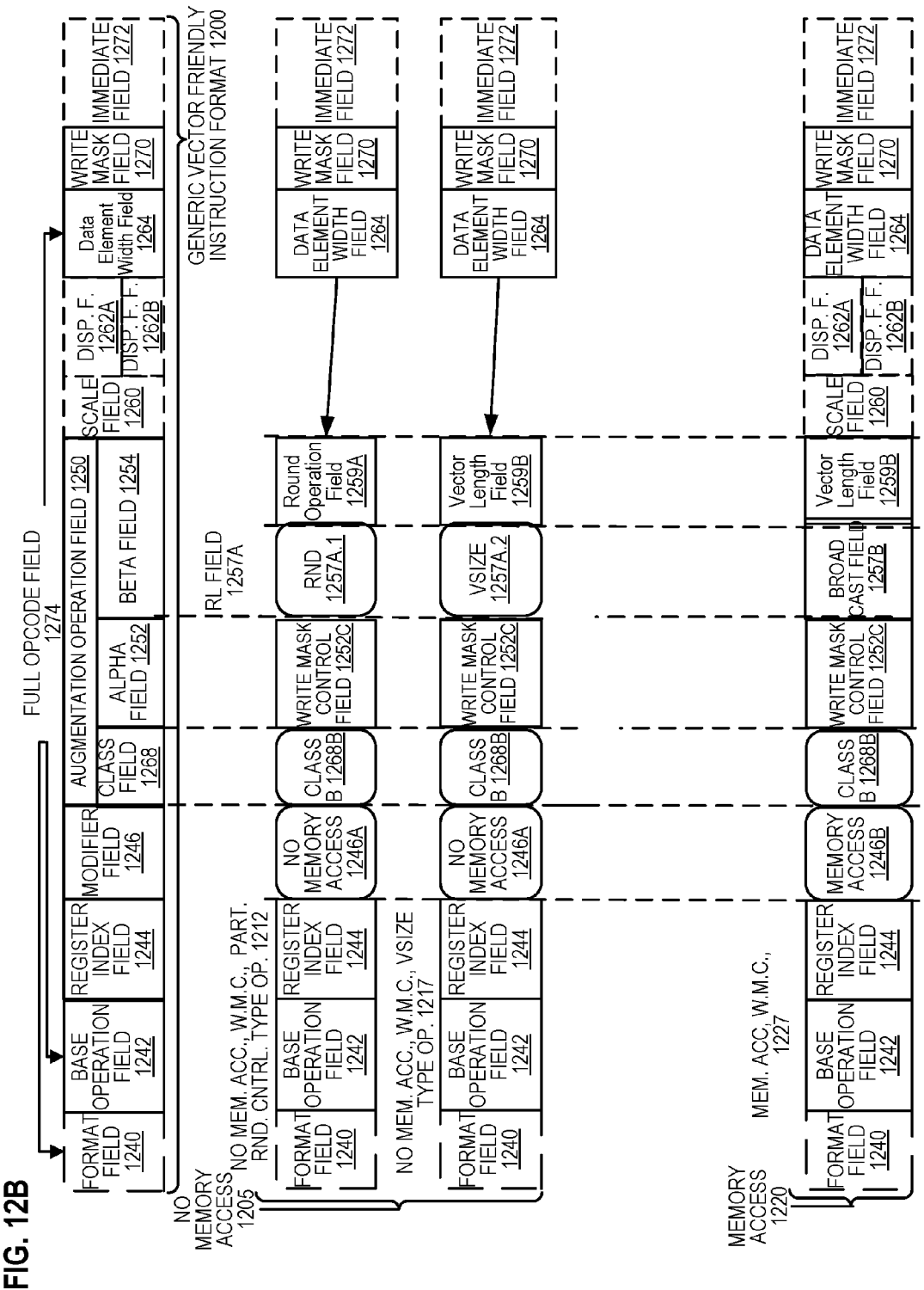

FIGS. 12A-12B are block diagrams illustrating a generic vector friendly instruction format and instruction templates thereof according to embodiments of the invention. FIG. 12A is a block diagram illustrating a generic vector friendly instruction format and class A instruction templates thereof according to embodiments of the invention; while FIG. 12B is a block diagram illustrating the generic vector friendly instruction format and class B instruction templates thereof according to embodiments of the invention. Specifically, a generic vector friendly instruction format 1200 for which are defined class A and class B instruction templates, both of which include no memory access 1205 instruction templates and memory access 1220 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 12A include: 1) within the no memory access 1205 instruction templates there is shown a no memory access, full round control type operation 1210 instruction template and a no memory access, data transform type operation 1215 instruction template; and 2) within the memory access 1220 instruction templates there is shown a memory access, temporal 1225 instruction template and a memory access, non-temporal 1230 instruction template. The class B instruction templates in FIG. 12B include: 1) within the no memory access 1205 instruction templates there is shown a no memory access, write mask control, partial round control type operation 1212 instruction template and a no memory access, write mask control, vsize type operation 1217 instruction template; and 2) within the memory access 1220 instruction templates there is shown a memory access, write mask control 1227 instruction template.

The generic vector friendly instruction format 1200 includes the following fields listed below in the order illustrated in FIGS. 12A-12B.

Format field 1240—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1242—its content distinguishes different base operations.

Register index field 1244—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1246—its content distinguishes occurrences of instructions in the generic vector instruction format that specify memory access from those that do not; that is, between no memory access 1205 instruction templates and memory access 1220 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1250—its content distinguishes which one of a variety of different operations to be performed in addition to the base operation. This field is context specific. In one embodiment of the invention, this field is divided into a class field 1268, an alpha field 1252, and a beta field 1254. The augmentation operation field 1250 allows common groups of operations to be performed in a single instruction rather than 2, 3, or 4 instructions.

Scale field 1260—its content allows for the scaling of the index field's content for memory address generation (e.g., for address generation that uses $2^{scale}*index+base$).

Displacement Field 1262A—its content is used as part of memory address generation (e.g., for address generation that uses $2^{scale}*index+base+displacement$).

Displacement Factor Field 1262B (note that the juxtaposition of displacement field 1262A directly over displacement factor field 1262B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1274 (described later herein) and the data manipulation field 1254C. The displacement field 1262A and the displacement factor field 1262B are optional in the sense that they are not used for the no memory access 1205 instruction templates and/or different embodiments may implement only one or none of the two.

Data element width field 1264—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1270—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1270 allows for partial vector operations, including loads, stores, arithmetic, logical, etc. While embodiments of the invention are described in which the write mask field's 1270 content selects one of a number of write mask registers that contains the write mask to be used (and thus the write mask field's 1270 content indirectly identifies that masking to be performed), alternative embodiments instead or additional allow the mask write field's 1270 content to directly specify the masking to be performed.

Immediate field 1272—its content allows for the specification of an immediate. This field is optional in the sense that is it not present in an implementation of the generic vector friendly format that does not support immediate and it is not present in instructions that do not use an immediate.

Class field 1268—its content distinguishes between different classes of instructions. With reference to FIGS. 12A-B, the contents of this field select between class A and class B instructions. In FIGS. 12A-B, rounded corner squares are used to indicate a specific value is present in a field (e.g., class A 1268A and class B 1268B for the class field 1268 respectively in FIGS. 12A-B).

Instruction Templates of Class A

In the case of the non-memory access 1205 instruction templates of class A, the alpha field 1252 is interpreted as an RS field 1252A, whose content distinguishes which one of the different augmentation operation types are to be performed (e.g., round 1252A.1 and data transform 1252A.2 are respectively specified for the no memory access, round type operation 1210 and the no memory access, data transform type operation 1215 instruction templates), while the beta field 1254 distinguishes which of the operations of the specified type is to be performed. In the no memory access 1205 instruction templates, the scale field 1260, the displacement field 1262A, and the displacement scale filed 1262B are not present.

No-Memory Access Instruction Templates—Full Round Control Type Operation

In the no memory access full round control type operation 1210 instruction template, the beta field 1254 is interpreted as a round control field 1254A, whose content(s) provide static rounding. While in the described embodiments of the invention the round control field 1254A includes a suppress all floating point exceptions (SAE) field 1256 and a round operation control field 1258, alternative embodiments may support may encode both these concepts into the same field or only have one or the other of these concepts/fields (e.g., may have only the round operation control field 1258).

SAE field 1256—its content distinguishes whether or not to disable the exception event reporting; when the SAE field's 1256 content indicates suppression is enabled, a given instruction does not report any kind of floating-point exception flag and does not raise any floating point exception handler.

Round operation control field 1258—its content distinguishes which one of a group of rounding operations to perform (e.g., Round-up, Round-down, Round-towards-zero and Round-to-nearest). Thus, the round operation control field 1258 allows for the changing of the rounding mode on a per instruction basis. In one embodiment of the invention where a processor includes a control register for specifying rounding modes, the round operation control field's 1250 content overrides that register value.

No Memory Access Instruction Templates—Data Transform Type Operation

In the no memory access data transform type operation 1215 instruction template, the beta field 1254 is interpreted as a data transform field 1254B, whose content distinguishes which one of a number of data transforms is to be performed (e.g., no data transform, swizzle, broadcast).

In the case of a memory access 1220 instruction template of class A, the alpha field 1252 is interpreted as an eviction hint field 1252B, whose content distinguishes which one of the eviction hints is to be used (in FIG. 12A, temporal 1252B.1 and non-temporal 1252B.2 are respectively specified for the memory access, temporal 1225 instruction template and the memory access, non-temporal 1230 instruction template), while the beta field 1254 is interpreted as a data manipulation field 1254C, whose content distinguishes which one of a number of data manipulation operations (also known as primitives) is to be performed (e.g., no manipulation; broadcast; up conversion of a source; and down conversion of a destination). The memory access 1220 instruction templates include the scale field 1260, and optionally the displacement field 1262A or the displacement scale field 1262B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1252 is interpreted as a write mask control (Z) field 1252C, whose content distinguishes whether the write masking controlled by the write mask field 1270 should be a merging or a zeroing.

In the case of the non-memory access 1205 instruction templates of class B, part of the beta field 1254 is interpreted as an RL field 1257A, whose content distinguishes which one of the different augmentation operation types are to be performed (e.g., round 1257A.1 and vector length (VSIZE) 1257A.2 are respectively specified for the no memory access, write mask control, partial round control type operation 1212 instruction template and the no memory access, write mask control, VSIZE type operation 1217 instruction template), while the rest of the beta field 1254 distinguishes which of the operations of the specified type is to be performed. In the no memory access 1205 instruction templates, the scale field 1260, the displacement field 1262A, and the displacement scale filed 1262B are not present.

In the no memory access, write mask control, partial round control type operation 1210 instruction template, the rest of the beta field 1254 is interpreted as a round operation field 1259A and exception event reporting is disabled (a given instruction does not report any kind of floating-point exception flag and does not raise any floating point exception handler).

Round operation control field 1259A—just as round operation control field 1258, its content distinguishes which one of a group of rounding operations to perform (e.g., Round-up, Round-down, Round-towards-zero and Round-to-nearest). Thus, the round operation control field 1259A allows for the changing of the rounding mode on a per instruction basis. In one embodiment of the invention where a processor includes a control register for specifying rounding modes, the round operation control field's 1250 content overrides that register value.

In the no memory access, write mask control, VSIZE type operation 1217 instruction template, the rest of the beta field 1254 is interpreted as a vector length field 1259B, whose content distinguishes which one of a number of data vector lengths is to be performed on (e.g., 128, 256, or 512 byte).

In the case of a memory access 1220 instruction template of class B, part of the beta field 1254 is interpreted as a broadcast field 1257B, whose content distinguishes whether or not the broadcast type data manipulation operation is to be performed, while the rest of the beta field 1254 is interpreted the vector length field 1259B. The memory access 1220 instruction templates include the scale field 1260, and optionally the displacement field 1262A or the displacement scale field 1262B.

With regard to the generic vector friendly instruction format 1200, a full opcode field 1274 is shown including the format field 1240, the base operation field 1242, and the data element width field 1264. While one embodiment is shown where the full opcode field 1274 includes all of these fields, the full opcode field 1274 includes less than all of these fields in embodiments that do not support all of them. The full opcode field 1274 provides the operation code (opcode).

The augmentation operation field 1250, the data element width field 1264, and the write mask field 1270 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 13A is a block diagram illustrating an exemplary specific vector friendly instruction format according to embodiments of the invention. FIG. 13A shows a specific vector friendly instruction format 1300 that is specific in the sense that it specifies the location, size, interpretation, and order of the fields, as well as values for some of those fields. The specific vector friendly instruction format 1300 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 12 into which the fields from FIG. 13A map are illustrated.

It should be understood that, although embodiments of the invention are described with reference to the specific vector friendly instruction format 1300 in the context of the generic vector friendly instruction format 1200 for illustrative purposes, the invention is not limited to the specific vector friendly instruction format 1300 except where claimed. For example, the generic vector friendly instruction format 1200 contemplates a variety of possible sizes for the various fields, while the specific vector friendly instruction format 1300 is shown as having fields of specific sizes. By way of specific example, while the data element width field 1264 is illustrated as a one bit field in the specific vector friendly instruction format 1300, the invention is not so limited (that is, the generic vector friendly instruction format 1200 contemplates other sizes of the data element width field 1264).

The generic vector friendly instruction format 1200 includes the following fields listed below in the order illustrated in FIG. 13A.

EVEX Prefix (Bytes 0-3) 1302—is encoded in a four-byte form.

Format Field 1240 (EVEX Byte 0, bits [7:0])—the first byte (EVEX Byte 0) is the format field 1240 and it contains 0x62 (the unique value used for distinguishing the vector friendly instruction format in one embodiment of the invention).

The second-fourth bytes (EVEX Bytes 1-3) include a number of bit fields providing specific capability.

REX field 1305 (EVEX Byte 1, bits [7-5])—consists of a EVEX.R bit field (EVEX Byte 1, bit [7]—R), EVEX.X bit field (EVEX byte 1, bit [6]—X), and 1257 BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1210—this is the first part of the REX' field 1210 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1315 (EVEX byte 1, bits [3:0]-mmmm)—its content encodes an implied leading opcode byte (0F, 0F 38, or 0F 3).

Data element width field 1264 (EVEX byte 2, bit [7]-W)—is represented by the notation EVEX.W. EVEX.W is used to define the granularity (size) of the datatype (either 32-bit data elements or 64-bit data elements).

EVEX.vvvv 1320 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1320 encodes the 4 low-order bits of the first source register specifier stored in inverted (1s complement) form. Depending on the instruction, an extra different EVEX bit field is used to extend the specifier size to 32 registers.

EVEX.U 1268 Class field (EVEX byte 2, bit [2]-U)—If EVEX.U=0, it indicates class A or EVEX.U0; if EVEX.U=1, it indicates class B or EVEX.U1.

Prefix encoding field 1325 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1252 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 1254 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1210—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1270 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1330 (Byte 4) is also known as the opcode byte. Part of the opcode is specified in this field.

MOD R/M Field 1340 (Byte 5) includes MOD field 1342, Reg field 1344, and R/M field 1346. As previously described, the MOD field's 1342 content distinguishes between memory access and non-memory access operations. The role of Reg field 1344 can be summarized to two situations: encoding either the destination register operand or a source register operand, or be treated as an opcode extension and not used to encode any instruction operand. The role of R/M field 1346 may include the following: encoding the instruction operand that references a memory address, or encoding either the destination register operand or a source register operand.

Scale, Index, Base (SIB) Byte (Byte 6)—As previously described, the scale field's 1250 content is used for memory address generation. SIB.xxx 1354 and SIB.bbb 1356—the contents of these fields have been previously referred to with regard to the register indexes Xxxx and Bbbb.

Displacement field 1262A (Bytes 7-10)—when MOD field 1342 contains 10, bytes 7-10 are the displacement field 1262A, and it works the same as the legacy 32-bit displacement (disp32) and works at byte granularity.

Displacement factor field 1262B (Byte 7)—when MOD field 1342 contains 01, byte 7 is the displacement factor field 1262B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1262B is a reinterpretation of disp8; when using displacement factor field 1262B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1262B substitutes the legacy x86 instruction set 8-bit displacement. Thus, the displacement factor field 1262B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1272 operates as previously described.

Full Opcode Field

FIG. 13B is a block diagram illustrating the fields of the specific vector friendly instruction format 1300 that make up the full opcode field 1274 according to one embodiment of the invention. Specifically, the full opcode field 1274 includes the format field 1240, the base operation field 1242, and the data element width (W) field 1264. The base operation field 1242 includes the prefix encoding field 1325, the opcode map field 1315, and the real opcode field 1330.

Register Index Field

FIG. 13C is a block diagram illustrating the fields of the specific vector friendly instruction format 1300 that make up the register index field 1244 according to one embodiment of the invention. Specifically, the register index field 1244 includes the REX field 1305, the REX' field 1310, the MODR/M.reg field 1344, the MODR/M.r/m field 1346, the VVVV field 1320, xxx field 1354, and the bbb field 1356.

Augmentation Operation Field

Figure 13D:
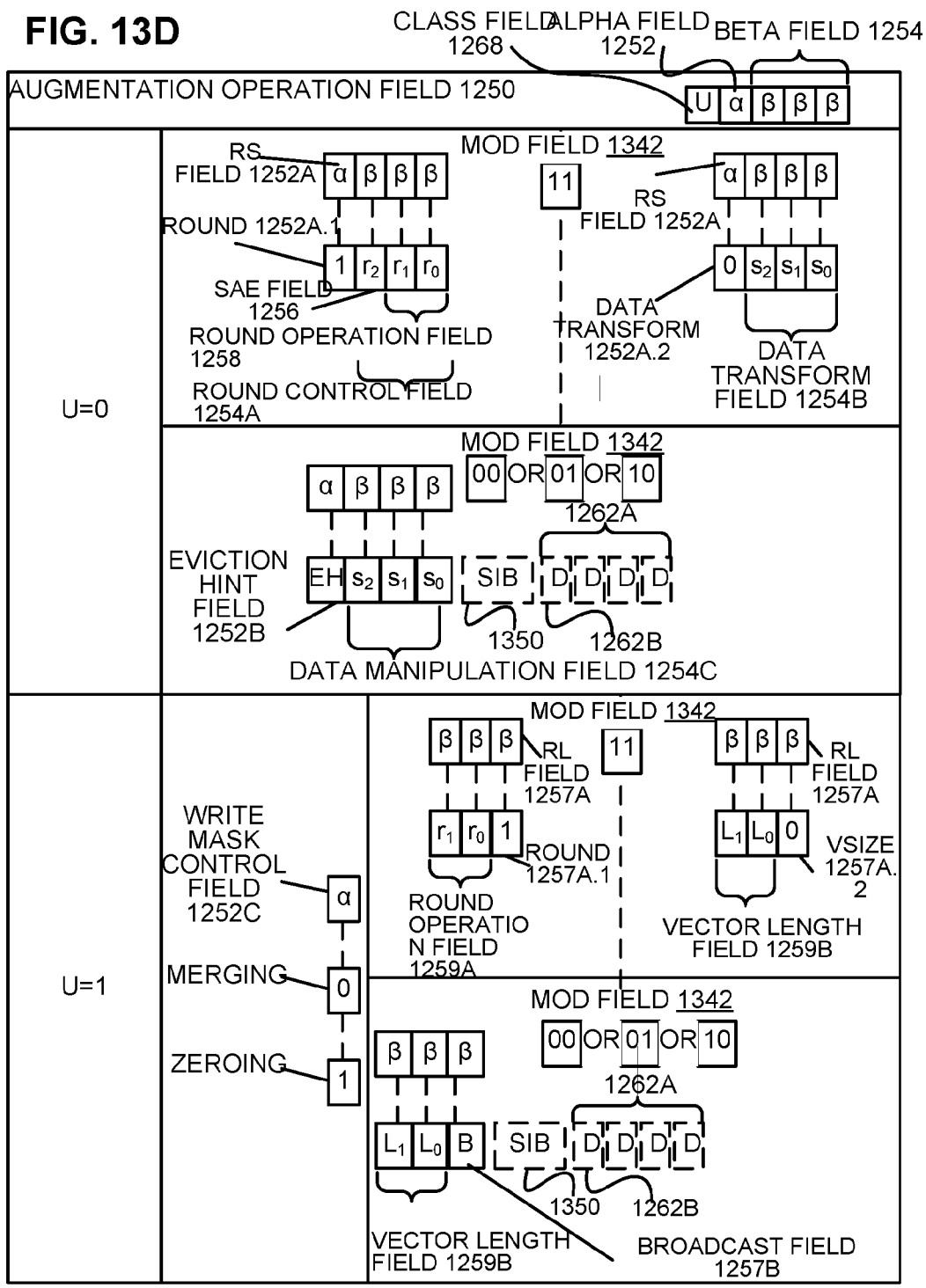
FIG. 13D is a block diagram illustrating the fields of the specific vector friendly instruction format 1300 that make up the augmentation operation field 1250 according to one embodiment of the invention.

FIG. 13D is a block diagram illustrating the fields of the specific vector friendly instruction format 1300 that make up the augmentation operation field 1250 according to one embodiment of the invention. When the class (U) field 1268 contains 0, it signifies EVEX.U0 (class A 1268A); when it contains 1, it signifies EVEX.U1 (class B 1268B). When U=0 and the MOD field 1342 contains 11 (signifying a no memory access operation), the alpha field 1252 (EVEX byte 3, bit [7]-EH) is interpreted as the rs field 1252A. When the rs field 1252A contains a 1 (round 1252A.1), the beta field 1254 (EVEX byte 3, bits [6:4]—SSS) is interpreted as the round control field 1254A. The round control field 1254A includes a one bit SAE field 1256 and a two bit round operation field 1258. When the rs field 1252A contains a 0 (data transform 1252A.2), the beta field 1254 (EVEX byte 3, bits [6:4]—SSS) is interpreted as a three bit data transform field 1254B. When U=0 and the MOD field 1342 contains 00, 01, or 10 (signifying a memory access operation), the alpha field 1252 (EVEX byte 3, bit [7]-EH) is interpreted as the eviction hint (EH) field 1252B and the beta field 1254 (EVEX byte 3, bits [6:4]—SSS) is interpreted as a three bit data manipulation field 1254C.

When U=1, the alpha field 1252 (EVEX byte 3, bit [7]-EH) is interpreted as the write mask control (Z) field 1252C. When U=1 and the MOD field 1342 contains 11 (signifying a no memory access operation), part of the beta field 1254 (EVEX byte 3, bit [4]—$S_0$) is interpreted as the RL field 1257A; when it contains a 1 (round 1257A.1) the rest of the beta field 1254 (EVEX byte 3, bit [6-5]—$S_{2-1}$) is interpreted as the round operation field 1259A, while when the RL field 1257A contains a 0 (VSIZE 1257.A2) the rest of the beta field 1254 (EVEX byte 3, bit [6-5]—$S_{2-1}$) is interpreted as the vector length field 1259B (EVEX byte 3, bit [6-5]-$L_{1-0}$). When U=1 and the MOD field 1342 contains 00, 01, or 10 (signifying a memory access operation), the beta field 1254 (EVEX byte 3, bits [6:4]—SSS) is interpreted as the vector length field 1259B (EVEX byte 3, bit [6-5]-$L_{1-0}$) and the broadcast field 1257B (EVEX byte 3, bit [4]—B).

Exemplary Register Architecture

FIG. 14 is a block diagram of a register architecture 1400 according to one embodiment of the invention. In the embodiment illustrated, there are 32 vector registers 1410 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1300 operates on these overlaid register file as illustrated in the below tables.

| Adjustable Vector Length | Class | Operations | Registers |
|---|---|---|---|
| Instruction Templates that do not include the vector length field 1259B | A (FIG. 12A; U = 0) | 1210, 1215, 1225, 1230 | zmm registers (the vector length is 64 byte) |
|  | B (FIG. 12B; U = 1) | 1212 | zmm registers (the vector length is 64 byte) |
| Instruction templates that do include the vector length field 1259B | B (FIG. 12B; U = 1) | 1217, 1227 | zmm, ymm, or xmm registers (the vector length is 64 byte, 32 byte, or 16 byte) depending on the vector length field 1259B |

In other words, the vector length field 1259B selects between a maximum length and one or more other shorter lengths, where each such shorter length is half the length of the preceding length; and instructions templates without the vector length field 1259B operate on the maximum vector length. Further, in one embodiment, the class B instruction templates of the specific vector friendly instruction format 1300 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1415—in the embodiment illustrated, there are 8 write mask registers (k0 through k7), each 64 bits in size. In an alternate embodiment, the write mask registers 1415 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1425—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1445, on which is aliased the MMX packed integer flat register file 1450— in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 15A is a block diagram illustrating both an exemplary in-order pipeline and an exemplary register renaming, out-of-order issue/execution pipeline according to embodiments of the invention. FIG. 15B is a block diagram illustrating both an exemplary embodiment of an in-order architecture core and an exemplary register renaming, out-of-order issue/execution architecture core to be included in a processor according to embodiments of the invention. The solid lined boxes in FIGS. 15A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 15A, a processor pipeline 1500 includes a fetch stage 1502, a length decode stage 1504, a decode stage 1506, an allocation stage 1508, a renaming stage 1510, a scheduling (also known as a dispatch or issue) stage 1512, a register read/memory read stage 1514, an execute stage 1516, a write back/memory write stage 1518, an exception handling stage 1522, and a commit stage 1524.

FIG. 15B shows processor core 1590 including a front end unit 1530 coupled to an execution engine unit 1550, and both are coupled to a memory unit 1570. The core 1590 may be a reduced instruction set computing (RISC) core, a complex instruction set computing (CISC) core, a very long instruction word (VLIW) core, or a hybrid or alternative core type. As yet another option, the core 1590 may be a special-purpose core, such as, for example, a network or communication core, compression engine, coprocessor core, general purpose computing graphics processing unit (GPGPU) core, graphics core, or the like.

The front end unit 1530 includes a branch prediction unit 1532 coupled to an instruction cache unit 1534, which is coupled to an instruction translation lookaside buffer (TLB) 1536, which is coupled to an instruction fetch unit 1538, which is coupled to a decode unit 1540. The decode unit 1540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1590 includes a microcode ROM or other medium that stores microcode for certain macroinstructions (e.g., in decode unit 1540 or otherwise within the front end unit 1530). The decode unit 1540 is coupled to a rename/allocator unit 1552 in the execution engine unit 1550.

The execution engine unit 1550 includes the rename/allocator unit 1552 coupled to a retirement unit 1554 and a set of one or more scheduler unit(s) 1556. The scheduler unit(s) 1556 represents any number of different schedulers, including reservations stations, central instruction window, etc. The scheduler unit(s) 1556 is coupled to the physical register file(s) unit(s) 1558. Each of the physical register file(s) units 1558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1558 comprises a vector registers unit, a write mask registers unit, and a scalar registers unit. These register units may provide architectural vector registers, vector mask registers, and general purpose registers. The physical register file(s) unit(s) 1558 is overlapped by the retirement unit 1554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1554 and the physical register file(s) unit(s) 1558 are coupled to the execution cluster(s) 1560. The execution cluster(s) 1560 includes a set of one or more execution units 1562 and a set of one or more memory access units 1564. The execution units 1562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1556, physical register file(s) unit(s) 1558, and execution cluster(s) 1560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1564). It should also be understood that where separate pipelines are used, one or more of these pipelines may be out-of-order issue/execution and the rest in-order.

The set of memory access units 1564 is coupled to the memory unit 1570, which includes a data TLB unit 1572 coupled to a data cache unit 1574 coupled to a level 2 (L2) cache unit 1576. In one exemplary embodiment, the memory access units 1564 may include a load unit, a store address unit, and a store data unit, each of which is coupled to the data TLB unit 1572 in the memory unit 1570. The instruction cache unit 1534 is further coupled to a level 2 (L2) cache unit 1576 in the memory unit 1570. The L2 cache unit 1576 is coupled to one or more other levels of cache and eventually to a main memory.

By way of example, the exemplary register renaming, out-of-order issue/execution core architecture may implement the pipeline 1500 as follows: 1) the instruction fetch 1538 performs the fetch and length decoding stages 1502 and 1504; 2) the decode unit 1540 performs the decode stage 1506; 3) the rename/allocator unit 1552 performs the allocation stage 1508 and renaming stage 1510; 4) the scheduler unit(s) 1556 performs the schedule stage 1512; 5) the physical register file(s) unit(s) 1558 and the memory unit 1570 perform the register read/memory read stage 1514; the execution cluster 1560 perform the execute stage 1516; 6) the memory unit 1570 and the physical register file(s) unit(s) 1558 perform the write back/memory write stage 1518; 7) various units may be involved in the exception handling stage 1522; and 8) the retirement unit 1554 and the physical register file(s) unit(s) 1558 perform the commit stage 1524.

The core 1590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1534/1574 and a shared L2 cache unit 1576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 16B:
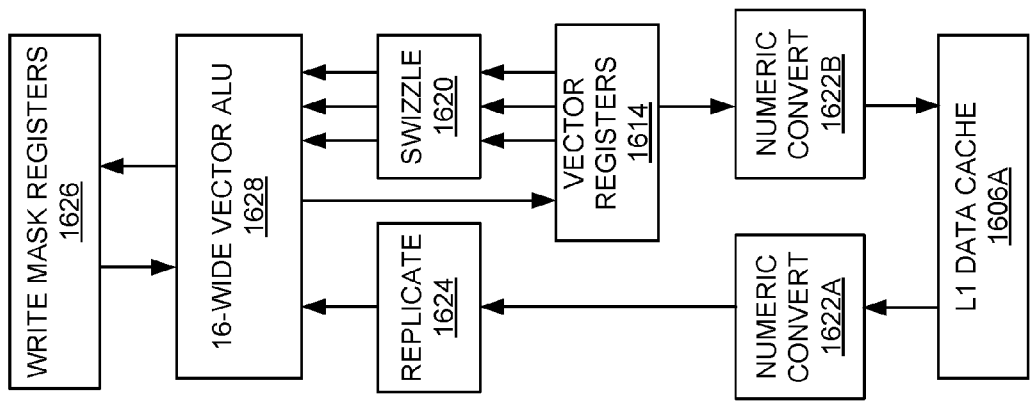
FIGS. 16A-B illustrate a block diagram of a more specific exemplary in-order core architecture, which core would be one of several logic blocks (including other cores of the same type and/or different types) in a chip.
Figure 16A:
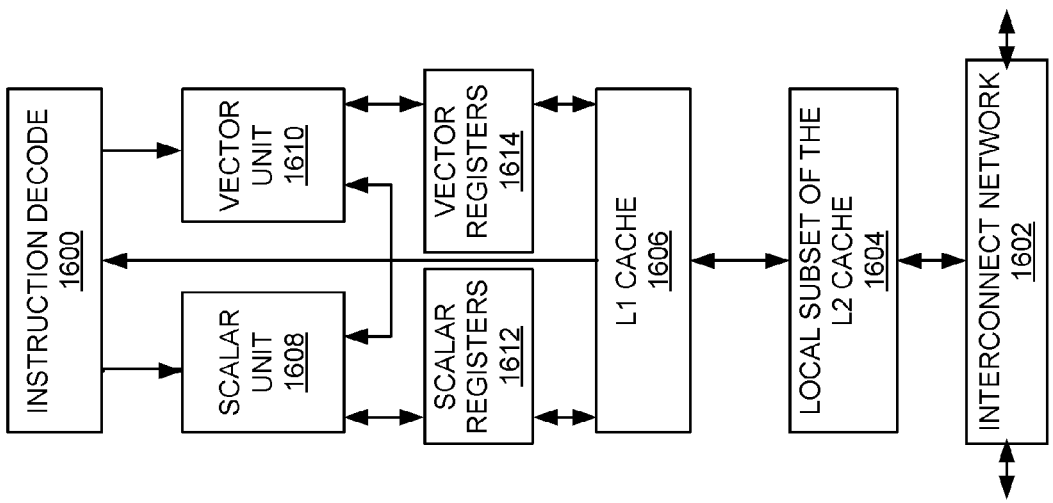

FIGS. 16A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 16A is a block diagram of a single processor core, along with its connection to the on-die interconnect network 1602 and with its local subset of the Level 2 (L2) cache 1604, according to embodiments of the invention. In one embodiment, an instruction decoder 1600 supports the x86 instruction set with a packed data instruction set extension. An L1 cache 1606 allows low-latency accesses to cache memory into the scalar and vector units. While in one embodiment (to simplify the design), a scalar unit 1608 and a vector unit 1610 use separate register sets (respectively, scalar registers 1612 and vector registers 1614) and data transferred between them is written to memory and then read back in from a level 1 (L1) cache 1606, alternative embodiments of the invention may use a different approach (e.g., use a single register set or include a communication path that allow data to be transferred between the two register files without being written and read back).

The local subset of the L2 cache 1604 is part of a global L2 cache that is divided into separate local subsets, one per processor core. Each processor core has a direct access path to its own local subset of the L2 cache 1604. Data read by a processor core is stored in its L2 cache subset 1604 and can be accessed quickly, in parallel with other processor cores accessing their own local L2 cache subsets. Data written by a processor core is stored in its own L2 cache subset 1604 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 16B is an expanded view of part of the processor core in FIG. 16A according to embodiments of the invention. FIG. 16B includes an L1 data cache 1606A part of the L1 cache 1604, as well as more detail regarding the vector unit 1610 and the vector registers 1614. Specifically, the vector unit 1610 is a 16-wide vector processing unit (VPU) (see the 16-wide ALU 1628), which executes one or more of integer, single-precision float, and double-precision float instructions. The VPU supports swizzling the register inputs with swizzle unit 1620, numeric conversion with numeric convert units 1622A-B, and replication with replication unit 1624 on the memory input. Write mask registers 1626 allow predicating resulting vector writes.

Figure 17:
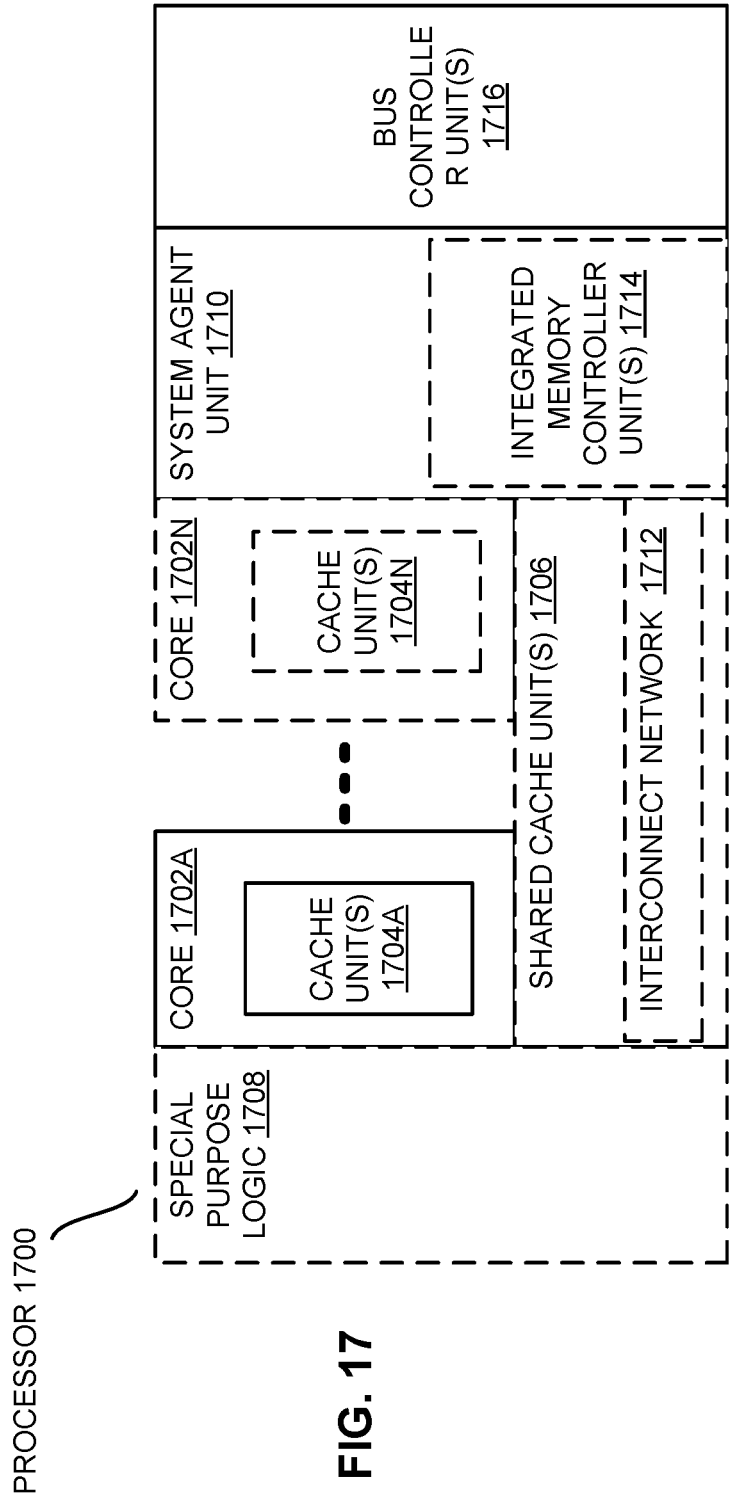
FIG. 17 is a block diagram of a processor 1700 that may have more than one core, may have an integrated memory controller, and may have integrated graphics according to embodiments of the invention.

FIG. 17 is a block diagram of a processor 1700 that may have more than one core, may have an integrated memory controller, and may have integrated graphics according to embodiments of the invention. The solid lined boxes in FIG. 17 illustrate a processor 1700 with a single core 1702A, a system agent 1710, a set of one or more bus controller units 1716, while the optional addition of the dashed lined boxes illustrates an alternative processor 1700 with multiple cores 1702A-N, a set of one or more integrated memory controller unit(s) 1714 in the system agent unit 1710, and special purpose logic 1708.

Thus, different implementations of the processor 1700 may include: 1) a CPU with the special purpose logic 1708 being integrated graphics and/or scientific (throughput) logic (which may include one or more cores), and the cores 1702A-N being one or more general purpose cores (e.g., general purpose in-order cores, general purpose out-of-order cores, a combination of the two); 2) a coprocessor with the cores 1702A-N being a large number of special purpose cores intended primarily for graphics and/or scientific (throughput); and 3) a coprocessor with the cores 1702A-N being a large number of general purpose in-order cores. Thus, the processor 1700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1706, and external memory (not shown) coupled to the set of integrated memory controller units 1714. The set of shared cache units 1706 may include one or more mid-level caches, such as level 2 (L2), level 3 (L3), level 4 (L4), or other levels of cache, a last level cache (LLC), and/or combinations thereof. While in one embodiment a ring based interconnect unit 1712 interconnects the integrated graphics logic 1708 (integrated graphics logic 1708 is an example of and is also referred to herein as special purpose logic), the set of shared cache units 1706, and the system agent unit 1710/integrated memory controller unit(s) 1714, alternative embodiments may use any number of well-known techniques for interconnecting such units. In one embodiment, coherency is maintained between one or more cache units 1706 and cores 1702-A-N.

In some embodiments, one or more of the cores 1702A-N are capable of multithreading. The system agent 1710 includes those components coordinating and operating cores 1702A-N. The system agent unit 1710 may include for example a power control unit (PCU) and a display unit. The PCU may be or include logic and components needed for regulating the power state of the cores 1702A-N and the integrated graphics logic 1708. The display unit is for driving one or more externally connected displays.

The cores 1702A-N may be homogenous or heterogeneous in terms of architecture instruction set; that is, two or more of the cores 1702A-N may be capable of execution the same instruction set, while others may be capable of executing only a subset of that instruction set or a different instruction set.

Exemplary Computer Architectures

FIGS. 18-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 18:
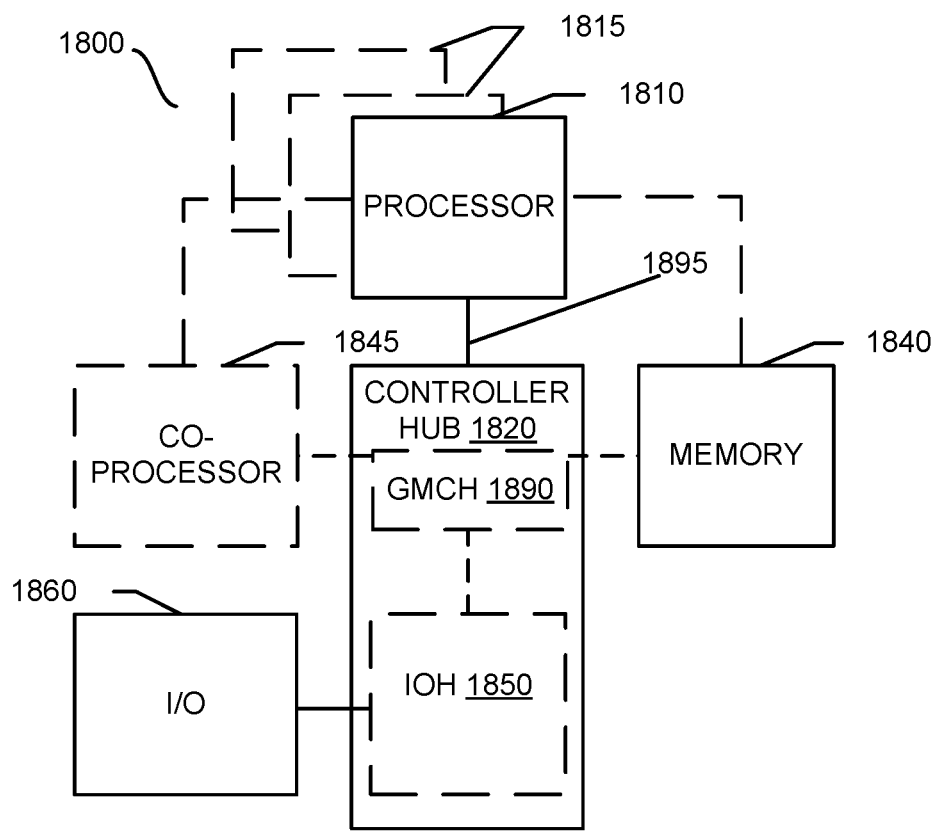
FIGS. 18-21 are block diagrams of exemplary computer architectures.

Referring now to FIG. 18, shown is a block diagram of a system 1800 in accordance with one embodiment of the present invention. The system 1800 may include one or more processors 1810, 1815, which are coupled to a controller hub 1820. In one embodiment the controller hub 1820 includes a graphics memory controller hub (GMCH) 1890 and an Input/Output Hub (IOH) 1850 (which may be on separate chips); the GMCH 1890 includes memory and graphics controllers to which are coupled memory 1840 and a coprocessor 1845; the IOH 1850 couples input/output (I/O) devices 1860 to the GMCH 1890. Alternatively, one or both of the memory and graphics controllers are integrated within the processor (as described herein), the memory 1840 and the coprocessor 1845 are coupled directly to the processor 1810, and the controller hub 1820 in a single chip with the IOH 1850.

The optional nature of additional processors 1815 is denoted in FIG. 18 with broken lines. Each processor 1810, 1815 may include one or more of the processing cores described herein and may be some version of the processor 1700.

The memory 1840 may be, for example, dynamic random access memory (DRAM), phase change memory (PCM), or a combination of the two. For at least one embodiment, the controller hub 1820 communicates with the processor(s) 1810, 1815 via a multi-drop bus, such as a frontside bus (FSB), point-to-point interface such as QuickPath Interconnect (QPI), or similar connection 1895.

In one embodiment, the coprocessor 1845 is a special-purpose processor, such as, for example, a high-throughput MIC processor, a network or communication processor, compression engine, graphics processor, GPGPU, embedded processor, or the like. In one embodiment, controller hub 1820 may include an integrated graphics accelerator.

There can be a variety of differences between the physical resources 1810, 1815 in terms of a spectrum of metrics of merit including architectural, microarchitectural, thermal, power consumption characteristics, and the like.

In one embodiment, the processor 1810 executes instructions that control data processing operations of a general type. Embedded within the instructions may be coprocessor instructions. The processor 1810 recognizes these coprocessor instructions as being of a type that should be executed by the attached coprocessor 1845. Accordingly, the processor 1810 issues these coprocessor instructions (or control signals representing coprocessor instructions) on a coprocessor bus or other interconnect, to coprocessor 1845. Coprocessor(s) 1845 accept and execute the received coprocessor instructions.

Figure 19:
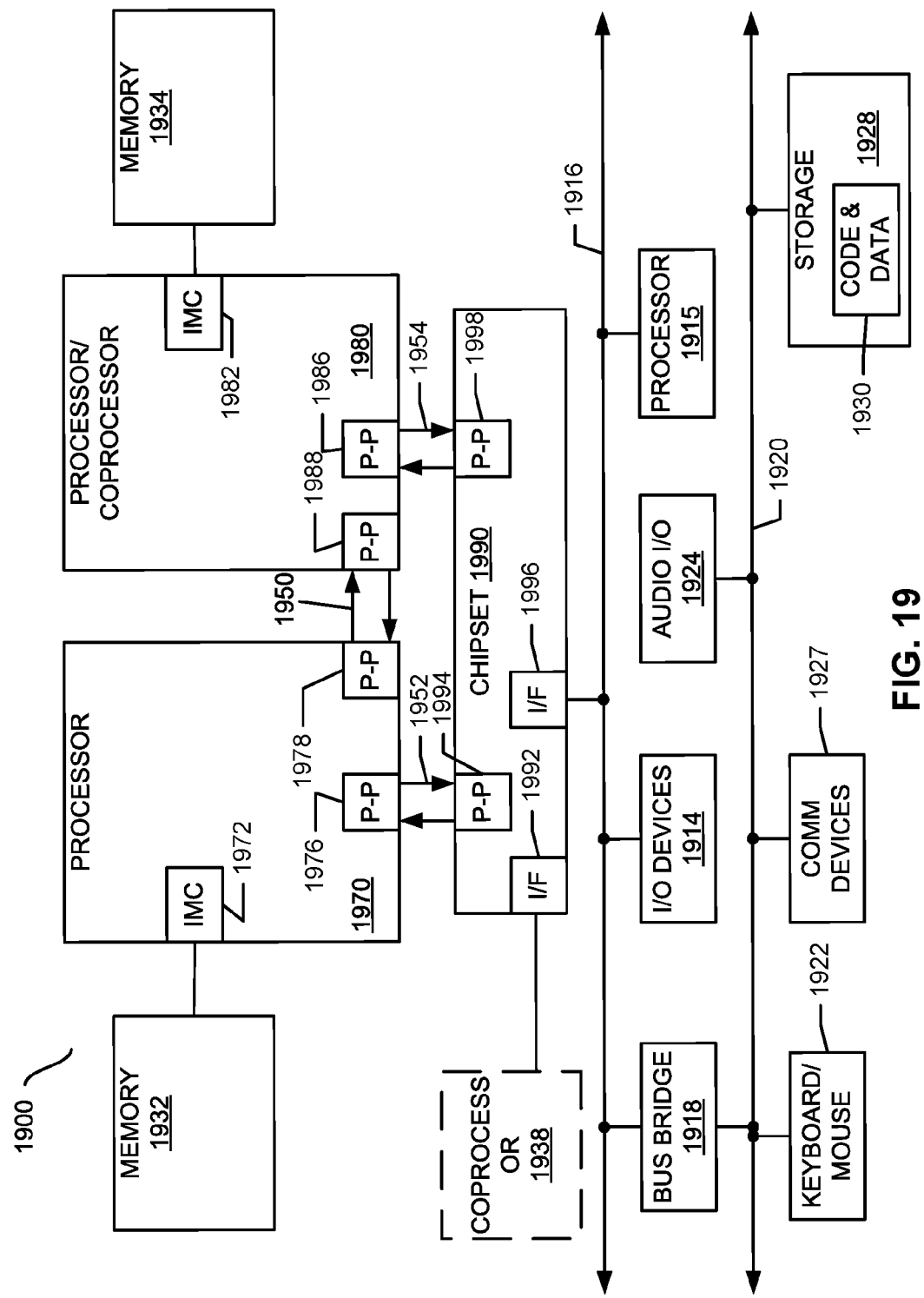

Referring now to FIG. 19, shown is a block diagram of a first more specific exemplary system 1900 in accordance with an embodiment of the present invention. As shown in FIG. 19, multiprocessor system 1900 is a point-to-point interconnect system, and includes a first processor 1970 and a second processor 1980 coupled via a point-to-point interconnect 1950. Each of processors 1970 and 1980 may be some version of the processor 1700. In one embodiment of the invention, processors 1970 and 1980 are respectively processors 1810 and 1815, while coprocessor 1938 is coprocessor 1845. In another embodiment, processors 1970 and 1980 are respectively processor 1810 coprocessor 1845.

Processors 1970 and 1980 are shown including integrated memory controller (IMC) units 1972 and 1982, respectively. Processor 1970 also includes as part of its bus controller units point-to-point (P-P) interfaces 1976 and 1978; similarly, second processor 1980 includes P-P interfaces 1986 and 1988. Processors 1970, 1980 may exchange information via a point-to-point (P-P) interface 1950 using P-P interface circuits 1978, 1988. As shown in FIG. 19, IMCs 1972 and 1982 couple the processors to respective memories, namely a memory 1932 and a memory 1934, which may be portions of main memory locally attached to the respective processors.

Processors 1970, 1980 may each exchange information with a chipset 1990 via individual P-P interfaces 1952, 1954 using point to point interface circuits 1976, 1994, 1986, 1998. Chipset 1990 may optionally exchange information with the coprocessor 1938 via a high-performance interface 1992. In one embodiment, the coprocessor 1938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1990 may be coupled to a first bus 1916 via an interface 1996. In one embodiment, first bus 1916 may be a Peripheral Component Interconnect (PCI) bus, or a bus such as a PCI Express bus or another third generation I/O interconnect bus, although the scope of the present invention is not so limited.

As shown in FIG. 19, various I/O devices 1914 may be coupled to first bus 1916, along with a bus bridge 1918 which couples first bus 1916 to a second bus 1920. In one embodiment, one or more additional processor(s) 1915, such as coprocessors, high-throughput MIC processors, GPGPU's, accelerators (such as, e.g., graphics accelerators or digital signal processing (DSP) units), field programmable gate arrays, or any other processor, are coupled to first bus 1916. In one embodiment, second bus 1920 may be a low pin count (LPC) bus. Various devices may be coupled to a second bus 1920 including, for example, a keyboard and/or mouse 1922, communication devices 1927 and a storage unit 1928 such as a disk drive or other mass storage device which may include instructions/code and data 1930, in one embodiment. Further, an audio I/O 1924 may be coupled to the second bus 1920. Note that other architectures are possible. For example, instead of the point-to-point architecture of FIG. 19, a system may implement a multi-drop bus or other such architecture.

Figure 20:
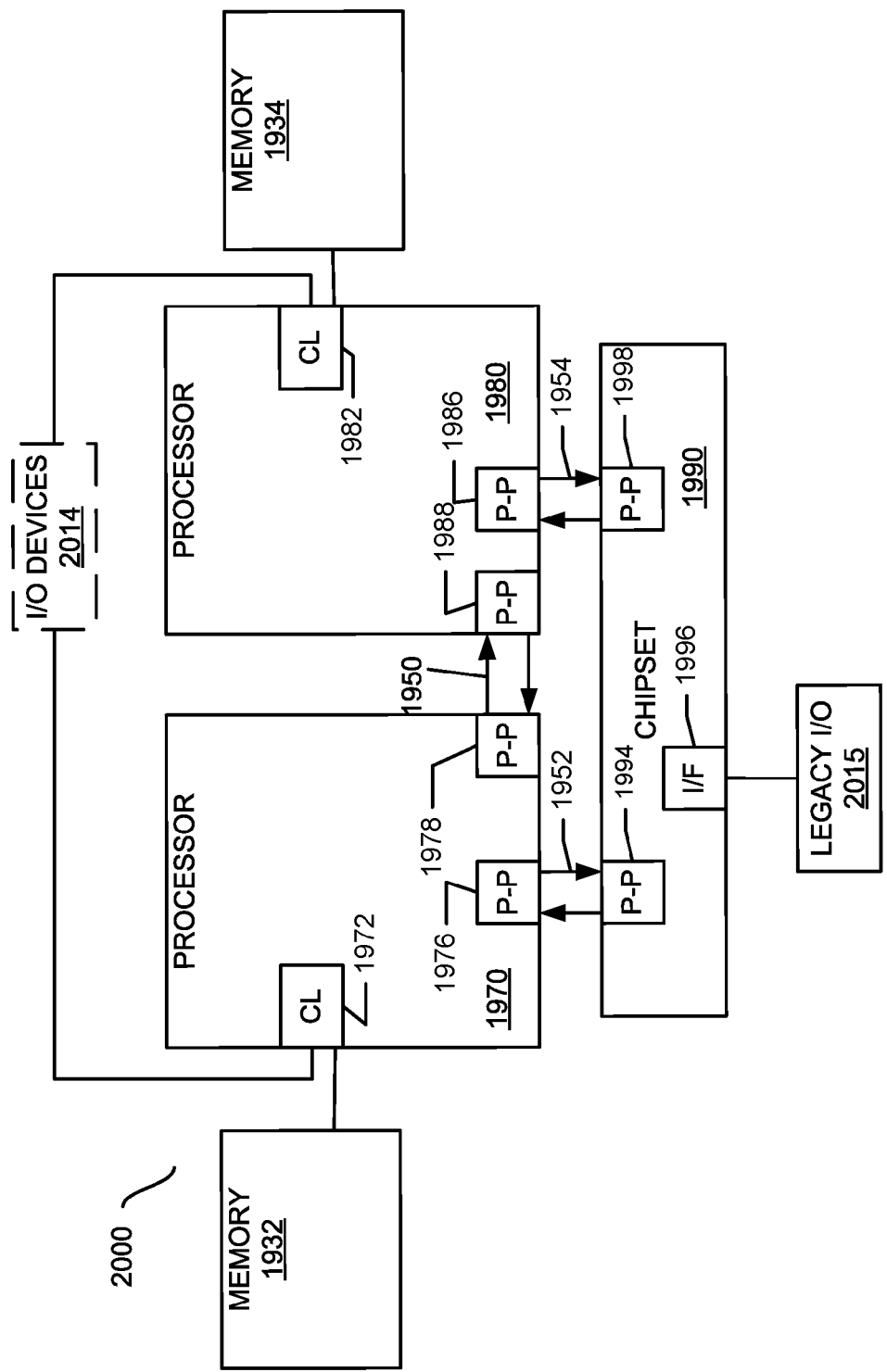

Referring now to FIG. 20, shown is a block diagram of a second more specific exemplary system 2000 in accordance with an embodiment of the present invention. Like elements in FIGS. 19 and 20 bear like reference numerals, and certain aspects of FIG. 19 have been omitted from FIG. 20 in order to avoid obscuring other aspects of FIG. 20.

FIG. 20 illustrates that the processors 1970, 1980 may include integrated memory and I/O control logic ("CL") 1972 and 1982, respectively. Thus, the CL 1972, 1982 include integrated memory controller units and include I/O control logic. FIG. 20 illustrates that not only are the memories 1932, 1934 coupled to the CL 1972, 1982, but also that I/O devices 2014 are also coupled to the control logic 1972, 1982. Legacy I/O devices 2015 are coupled to the chipset 1990.

Figure 21:
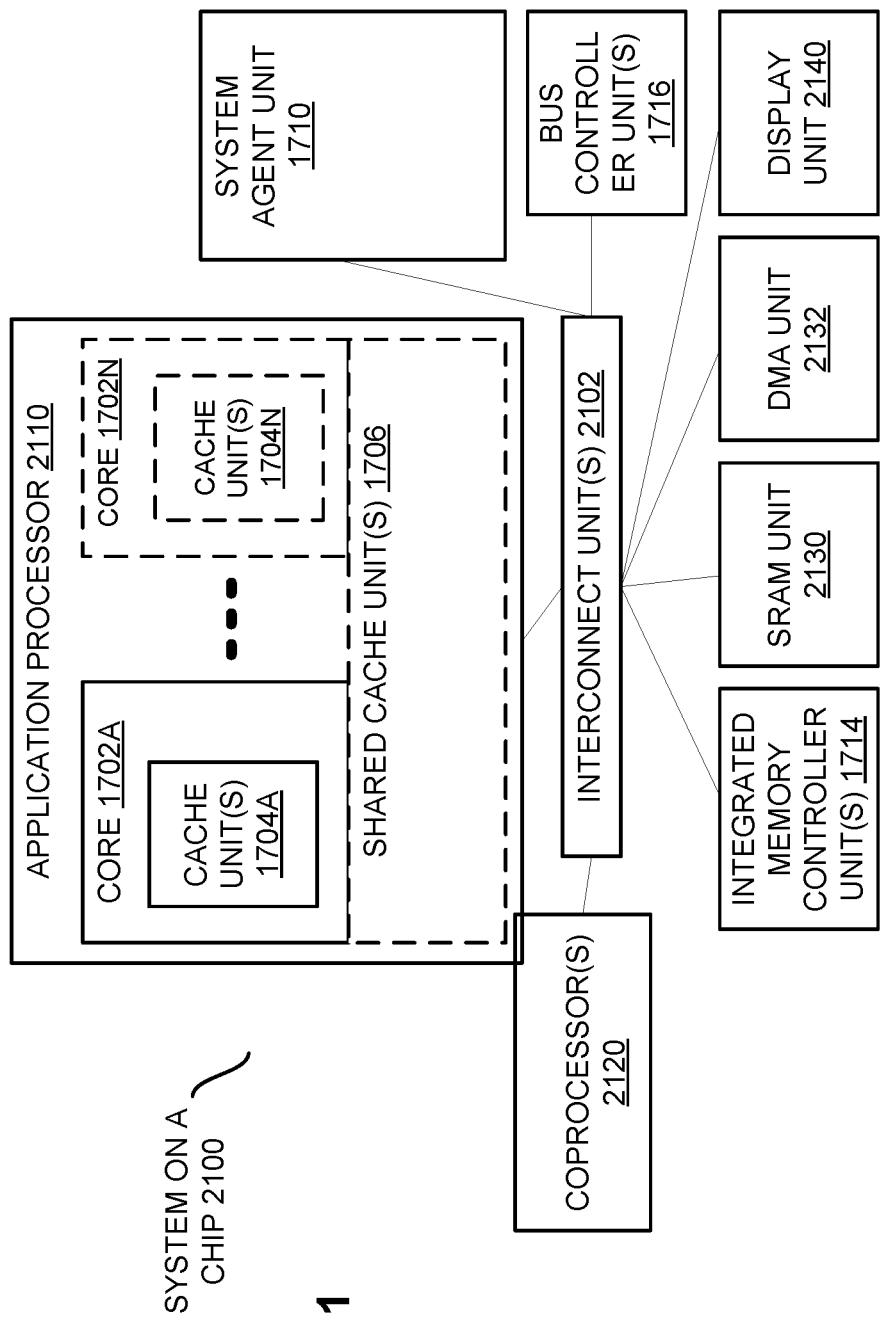

Referring now to FIG. 21, shown is a block diagram of a SoC 2100 in accordance with an embodiment of the present invention. Similar elements in FIG. 17 bear like reference numerals. Also, dashed lined boxes are optional features on more advanced SoCs. In FIG. 21, an interconnect unit(s) 2102 is coupled to: an application processor 2110 which includes a set of one or more cores 1702A-N, which include cache units 1704A-N, and shared cache unit(s) 1706; a system agent unit 1710; a bus controller unit(s) 1716; an integrated memory controller unit(s) 1714; a set or one or more coprocessors 2120 which may include integrated graphics logic, an image processor, an audio processor, and a video processor; an static random access memory (SRAM) unit 2130; a direct memory access (DMA) unit 2132; and a display unit 2140 for coupling to one or more external displays. In one embodiment, the coprocessor(s) 2120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1930 illustrated in FIG. 19, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 22:
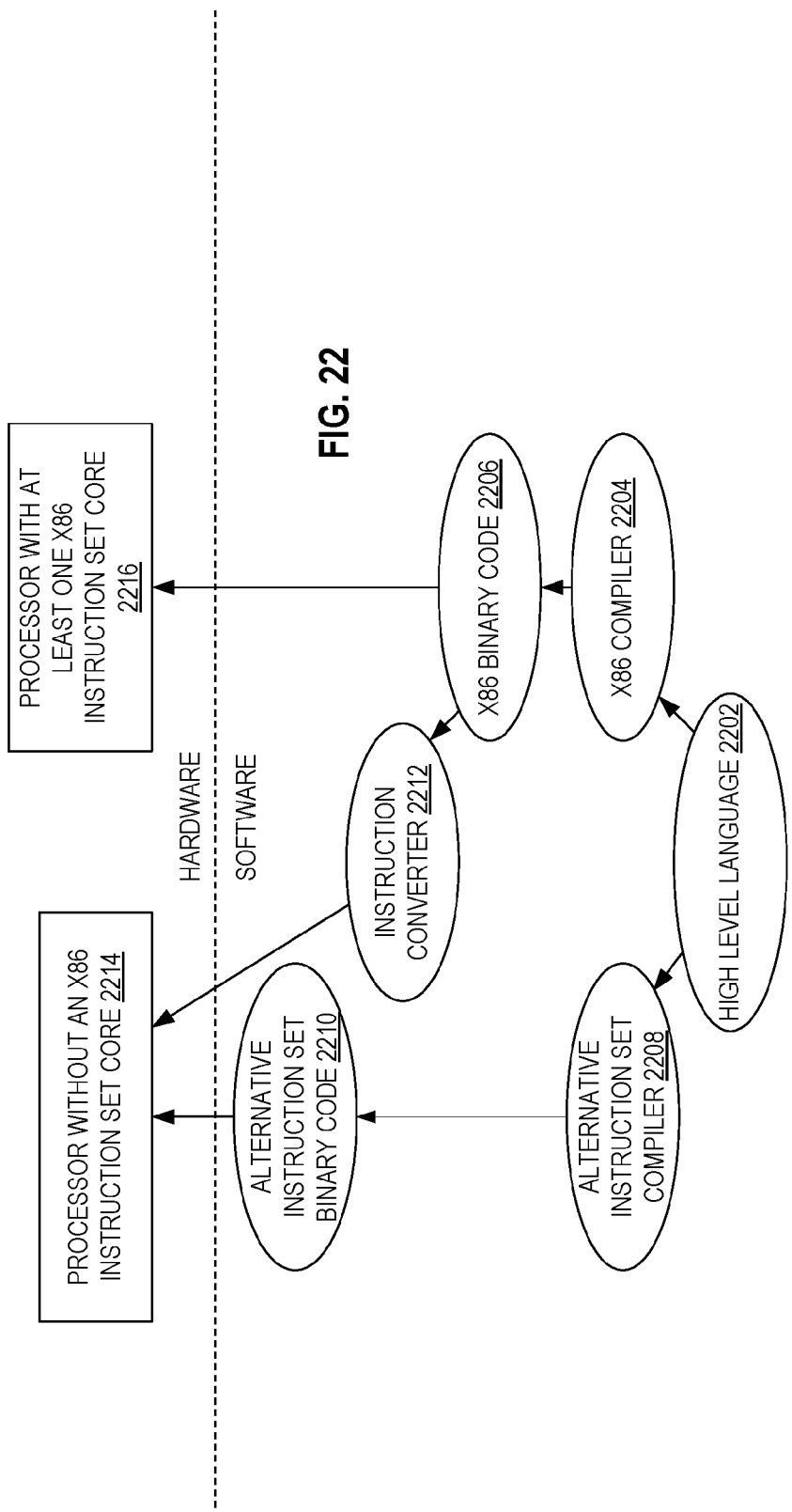
FIG. 22 is a block diagram contrasting the use of a software instruction converter to convert binary instructions

FIG. 22 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 22 shows a program in a high level language 2202 may be compiled using an x86 compiler 2204 to generate x86 binary code 2206 that may be natively executed by a processor with at least one x86 instruction set core 2216. The processor with at least one x86 instruction set core 2216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2204 represents a compiler that is operable to generate x86 binary code 2206 (e.g., object code) that can, with or without additional linkage processing, be executed on the processor with at least one x86 instruction set core 2216.

Similarly, FIG. 22 shows the program in the high level language 2202 may be compiled using an alternative instruction set compiler 2208 to generate alternative instruction set binary code 2210 that may be natively executed by a processor without at least one x86 instruction set core 2214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2212 is used to convert the x86 binary code 2206 into code that may be natively executed by the processor without an x86 instruction set core 2214. This converted code is not likely to be the same as the alternative instruction set binary code 2210 because an instruction converter capable of this is difficult to make; however, the converted code will accomplish the general operation and be made up of instructions from the alternative instruction set. Thus, the instruction converter 2212 represents software, firmware, hardware, or a combination thereof that, through emulation, simulation or any other process, allows a processor or other electronic device that does not have an x86 instruction set processor or core to execute the x86 binary code 2206.

FURTHER EXAMPLES

Example 1 provides a system that includes: a memory having stored thereon a basic input/output system (BIOS) program comprising a readable code region and a readable and writeable data stack, and a circuit coupled to the memory and to: read, during a boot mode and while using a cache as RAM (CAR), at least one datum from each cache line of the data stack, and write at least one byte of each cache line of the data stack to set a state of each cache line of the data stack to modified, enter a no-modified-data-eviction mode to protect modified data from eviction, and to allow eviction and replacement of readable data, and begin reading from the readable code region and executing the BIOS program after entering the no-modified-data-eviction mode.

Example 2 includes the substance of example 1, wherein the cache as RAM comprises at least two cache ways, and wherein the circuit to use a first way-mask during the reading the at least one datum from each cache line of the data stack to cause the cache lines of the data stack to be loaded into a first number of ways of the cache as RAM.

Example 3 includes the substance of example 2, wherein cache lines stored in the first number of ways of the cache as RAM be protected from eviction.

Example 4 includes the substance of any one of examples 2-3, wherein the circuit to use a second way-mask during the reading from the readable code region to cause the readable code data to be loaded into a second number of ways of the cache as RAM, the cache lines in the second number of ways to be allowed to be evicted and replaced.

Example 5 includes the substance of example 4, wherein a code region size is not limited by a cache as RAM size.

Example 6 includes the substance of example 5, wherein the circuit is further to continue reading from the readable code region while allowing at least one readable code region cache line to be evicted and replaced.

Example 7 includes the substance of example 6, wherein the first way mask and the second way mask comprise software-accessible model-specific registers, and wherein the circuit further to use a software-accessible way control register to specify what mask to use during read and write operations.

Example 8 includes the substance of example 1, wherein the cache as RAM is a level 3 cache and the at least two processor cores each include a level 1 cache and a level 2 cache, wherein a code region size is not limited by a level 3 cache size.

Example 9 includes the substance of any one of examples 1-8, wherein the memory is selected from the group consisting of: a read-only memory, a programmable read-only memory, an erasable programmable read-only memory, an electrically erasable programmable read-only memory, and a flash memory.

Example 10 includes the substance of any one of examples 2-7, wherein the circuit to utilize a cache allocation technology to control which cache ways of the cache as RAM are to be protected from eviction.

Example 11 provides a system that includes: circuitry to: read, using a cache as RAM (CAR) during a boot mode, at least one datum from each cache line of a data stack of a basic input/output system (BIOS) program having a readable code region and a readable and writeable data stack, and write at least one byte of each cache line of the data stack to set a state of each cache line of the data stack to modified, enter a no-modified-data-eviction mode to protect modified data from eviction, and to allow eviction and replacement of readable data, and begin reading from the readable code region and executing the BIOS program after entering the no-modified-data-eviction mode.

Example 12 includes the substance of example 11, wherein the cache as RAM comprises at least two cache ways, and wherein the circuitry to use a first way-mask during the reading the at least one datum from each cache line of the data stack to cause the cache lines of the data stack to be loaded into a first number of ways of the cache as RAM.

Example 13 includes the substance of example 12, wherein cache lines stored in the first number of ways of the cache as RAM are to be protected from eviction.

Example 14 includes the substance of any one of examples 12-13, wherein the circuitry to use a second way-mask during the reading from the readable code region to cause the readable code data to be loaded into a second number of ways of the cache as RAM, the cache lines in the second number of ways to be allowed to be evicted and replaced.

Example 15 includes the substance of any one of examples 12-14, wherein the first way mask and the second way mask comprise software-accessible model-specific registers, and wherein the circuitry further to use a software-accessible way control register to specify what mask to use during read and write operations.

Example 16 provides a method that includes: reading, from a memory having stored thereon a basic input/output system (BIOS) program comprising a readable code region and a readable and writeable data stack, during a boot mode and while using a cache as RAM (CAR), at least one datum from each cache line of the data stack, and writing at least one byte of each cache line of the data stack to set a state of each cache line of the data stack to modified, entering a no-modified-data-eviction mode to protect modified data in the cache as RAM from eviction, and to allow eviction and replacement of readable data in the cache as RAM, and beginning reading from the readable code region and executing the BIOS program after entering the no-modified-data-eviction mode.

Example 17 includes the substance of example 16, wherein the cache as RAM comprises at least two cache ways, further comprising using a first way-mask during the reading the at least one datum from each cache line of the data stack to cause the cache lines of the data stack to be loaded into a first number of ways of the cache as RAM.

Example 18 includes the substance of example 17, wherein cache lines stored in the first number of ways of the cache as RAM are to be protected from eviction.

Example 19 includes the substance of any one of examples 17-18, further comprising using a second way-mask during the reading from the readable code region to cause the readable code data to be loaded into a second number of ways of the cache as RAM, the cache lines in the second number of ways to be allowed to be evicted and replaced.

Example 20 includes the substance of example 19, wherein a code region size is not limited by a cache as RAM size.

Example 21 includes the subject matter of any one of examples 19 to 20. In this example, a size of the code region is not limited by a size of the cache.

Example 22 includes the subject matter of example 21. This example further includes initializing the processor before reading the data stack from the non-volatile memory, wherein the initializing the processor comprises: clearing flags of the variable-range MTRR and the another variable-range MTRR, initializing the variable-range MTRR and the another variable-range MTRR to 0, and configuring a default memory type to un-cacheable (UC) in a memory type range register DEF-TYPE model specific register (MSR).

Example 23 includes the subject matter of any one of examples 19 to 22. This example further includes, after reading the at least one DWORD from each cache line of the data stack, writing at least one location in each cache line of the data stack to set each cache line of the data stack to a modified state.

Example 24 includes the subject matter of any one of examples 19 to 23. In this example, the non-volatile memory is selected from the group consisting of: a ROM, a PROM, an EPROM, an EEPROM, and a flash memory.

Example 25 includes the subject matter of any one of examples 19 to 24. This example further includes executing instructions from the BIOS program.

Example 26 includes the subject matter of any one of examples 19 to 25. In this example, the processor to utilize a Cache Allocation Technology (CAT) to control which cache ways are to be enabled for loading and protected from eviction.

Example 27 includes the subject matter of any one of examples 19 to 26. In this example, the first way mask and the second way mask comprise model-specific registers (MSRs) that are included in the processor's set of software-accessible MSRs, the first way mask and the second way mask to include one bit per each cache way to specify whether cache lines in that cache way are to be protected from eviction.

Example 28 includes the subject matter of example 28. In this example, the processor's set of software accessible MSRs further to include a cache-way-control MSR comprising a two-bit code to select whether to not apply any way mask, to apply the first way mask, or to apply the second way mask, and the fourth code value is reserved.

Example 29 provides a system including a non-volatile memory to have stored thereon a BIOS program, and a processor coupled to the non-volatile memory, the processor comprising an execution unit to perform the steps of: reading from a non-volatile memory by a processor during a boot mode, at least one datum from each cache line of a data stack of a BIOS program, and using a first way mask to load the data stack into a first number of ways of a cache having the first number of ways to hold read/write (RW) data and a second number of ways to hold readable data read from a code region of the BIOS program, beginning execution of the BIOS program by the processor using the cache in a Cache-as-RAM (CAR) mode after entering a no-eviction mode (NEM) during which a second way mask is to protect data stack cache lines stored in the first number of ways from eviction, and to allow unlimited eviction and replacement of code cache lines from the second number of ways.

Example 30 includes the substance of example 29. In this example, the execution unit is further to perform the steps of: configuring a variable-range memory type range register (MTRR) to set the memory associated with the code region as write-protected (WP) cacheable memory, configuring another variable-range MTRR to set the memory associated with the data stack as write-back (WB) cacheable memory, configuring a MTRR PHYSMASK register to reflect a size of the data stack, and set a valid bit of the MTRR PHYS-MASK register, configuring another MTRR PHYSMASK register to reflect a size of the code region, and after entering the NEM mode, setting a valid bit of the another MTRR PHYSMASK register.

Example 31 includes the substance of example 30. In this example, the execution circuit further to initialize the processor before reading the data stack from the non-volatile memory, wherein the initializing the processor comprises: clearing flags of the variable-range MTRR and the another variable-range MTRR, initializing the variable-range MTRR and the another variable-range MTRR to 0, and configuring the default memory type to un-cacheable (UC) in a memory type range register DEF-TYPE model specific register (MSR).

Example 32 includes the substance of any one of examples 29 to 31. In this example, the execution circuit further to, after reading the at least one DWORD from each cache line of the data stack, write at least one location in each cache line of the data stack to set each cache line of the data stack to a modified state.

Example 33 includes the substance of any one of examples 29 to 32. In this example, the processor is to utilize a Cache Allocation Technology (CAT) to enable the second number of ways and the first number of ways to be loaded and evicted.

Example 34 includes the substance of any one of examples 29 to 33. In this example, the processor is one of at least two processors in a multiprocessor system, and wherein the processor is a sole boot-strap processor (BSP), the remaining processors to await completion of the boot mode in an IDLE state.

Example 35 includes the substance of any one of examples 29 to 35. In this example, the first way mask and the second way mask comprise model-specific registers (MSRs) that are included in the processor's set of software-accessible MSRs, the first way mask and the second way mask to include one bit per each cache way to specify whether cache lines in that cache way are to be protected from eviction.

Example 36 includes the substance of examples 35. In this example, the processor's set of software accessible MSRs further to include a cache-way-control MSR comprising a two-bit code to select whether to not apply any way mask, to apply the first way mask, or to apply the second way mask, and the fourth code value is reserved.

Example 37 includes the substance of any one of examples 29 to 36. In this example, a size of the code region is not limited by a size of the cache.

Example 38 provides a system including a non-volatile memory to have stored thereon a BIOS program, and a processor coupled to the non-volatile memory, the processor comprising: means for executing computer-executable instructions, means for reading from a non-volatile memory by a processor during a boot mode, at least one datum from each cache line of a data stack of a BIOS program, and means for using a first way mask to load the data stack into a first number of ways of a cache having a first number of ways to hold read/write (RW) data and a second number of ways to hold readable data read from a code region of the BIOS program, wherein the means for executing computer-executable instructions to begin execution of the BIOS program by the processor using the cache in a Cache-as-RAM (CAR) mode after entering a no-eviction mode (NEM) during which a second way mask is to protect data stack cache lines stored in the first number of ways from eviction, and to allow unlimited eviction and replacement of code cache lines from the second number of ways.

Example 39 includes the substance of example 38, wherein a size of the code region is not limited by a size of the cache.

Although some embodiments disclosed herein involve data handling and distribution in the context of hardware execution circuits, other embodiments can be accomplished by way of a data or instructions stored on a non-transitory machine-readable, tangible medium, which, when performed by a machine, cause the machine to perform functions consistent with at least one embodiment. In one embodiment, functions associated with embodiments of the present disclosure are embodied in machine-executable instructions. The instructions can be used to cause a general-purpose or special-purpose processor that is programmed with the instructions to perform the steps of the at least one embodiment. Embodiments disclosed herein may be provided as a computer program product or software which may include a machine or computer-readable medium having stored thereon instructions which may be used to program a computer (or other electronic devices) to perform one or more operations according to the at least one embodiment. Alternatively, steps of embodiments may be performed by specific hardware components that contain fixed-function logic for performing the steps, or by any combination of programmed computer components and fixed-function hardware components.

Instructions used to program logic to perform the at least one embodiment can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

What is claimed is:

1. A system comprising:
    a memory having stored thereon a basic input/output system (BIOS) program comprising a code region and a data stack;
    a cache to serve as random-access memory (RAM) during a boot mode;
    a circuit, during the boot mode, to:
        read at least one datum from each cache line of the data stack into the cache as RAM (CAR), and write at least one byte of each loaded cache line to cause its state to become a modified state; and
        subsequently, enter a no-modified-data-eviction mode and execute instructions fetched from the code region into the CAR, wherein the fetched instructions never attain the modified state during the boot mode and are freely evicted and replaced, as necessary, and wherein the cache lines loaded from the data stack maintain their modified state and are prevented from being evicted during the boot mode.

2. The system of claim 1, wherein the CAR comprises at least two cache ways, and wherein the circuit is to use a first way mask when reading the at least one datum from each cache line of the data stack to cause the cache lines of the data stack to be loaded into a first number of ways of the CAR.

3. The system of claim 2, wherein cache lines stored in the first number of ways of the CAR are protected from eviction.

4. The system of claim 3, wherein the circuit is to use a second way mask while fetching instructions from the code region to cause the fetched instructions to be loaded into a second number of ways of the CAR, the cache lines in the second number of ways to be allowed to be evicted and replaced.

5. The system of claim 4, wherein a size of the data stack is limited by a total size of the first number of ways, and a size of the of the code region is not limited by a size of the CAR.

6. The system of claim 5, wherein the circuit, during the boot mode, is further to continue reading from the code region while allowing at least one instruction to be evicted from the CAR and replaced.

7. The system of claim 6, wherein the first way mask and the second way mask comprise software-accessible model-specific registers, and wherein the circuit is further to use a software-accessible way control register to specify what mask to use during read and write operations.

8. The system of claim 1, wherein the CAR is a level 3 cache and the circuit comprises at least two processor cores each including a level 1 cache and a level 2 cache, wherein a size of the readable code region is not limited by a level 3 cache size.

9. The system of claim 1, wherein the memory is one of a read-only memory, a programmable read-only memory, an erasable programmable read-only memory, an electrically erasable programmable read-only memory, and a flash memory.

10. The system of claim 2, wherein the circuit is to utilize a cache allocation technology to control which cache ways of the CAR are to be protected from eviction.

11. An apparatus coupled to a memory having stored thereon a basic input/output system (BIOS) program comprising a code region and a data stack, the apparatus comprising:
 a cache to serve as random-access memory (RAM) during a boot mode;
 a circuit, during the boot mode, to:
  read at least one datum from each cache line of the data stack into the cache as RAM (CAR), and write at least one byte of each loaded cache line to cause its state to become a modified state; and
  subsequently, enter a no-modified-data-eviction mode and execute instructions fetched from the code region into the CAR, wherein the fetched instructions never attain the modified state during the boot mode and are freely evicted and replaced, as necessary, and wherein the cache lines loaded from the data stack maintain their modified state and are prevented from being evicted during the boot mode.

12. The apparatus of claim 11, wherein the CAR comprises at least two cache ways, and wherein the circuit is to use a first way mask when reading the at least one datum from each cache line of the data stack to cause the cache lines of the data stack to be loaded into a first number of ways of the CAR.

13. The apparatus of claim 12, wherein cache lines stored in the first number of ways of the CAR are to be protected from eviction.

14. The apparatus of claim 13, wherein the circuit is to use a second way mask when fetching instructions from the code region to cause the fetched instructions to be loaded into a second number of ways of the CAR, the cache lines in the second number of ways to be allowed to be evicted and replaced.

15. The apparatus of claim 14, wherein the first way mask and the second way mask comprise software-accessible model-specific registers, and wherein the circuit is further to use a software-accessible way control register to specify what mask to use during CAR read and write operations.

16. A method performed during a boot mode by a processor, the method comprising:
 using a first way mask to read at least one datum from each cache line of a data stack from a non-volatile memory into P ways of a cache having P ways to hold read/write (RW) data and O ways to hold read-only (RO) data, wherein the memory has stored thereon a basic input/output system (BIOS) program comprising a code region and the data stack;
 using a second way mask to read instructions from the code region into the O ways;
 entering a no-eviction mode during which the data stack cache lines in the P ways are protected from eviction, and the instructions in the O ways are allowed to be evicted; and
 subsequently, executing the BIOS program using the cache as a random-access memory (RAM) by fetching, decoding, and executing instructions cached in the O ways, wherein, during the boot mode, RO instructions cached in the O ways are freely evicted and replaced as necessary to make room for new instructions, and RW data stack cache lines in the P ways are prevented from being evicted.

17. The method of claim 16, wherein the first way mask and the second way mask comprise software-accessible model-specific registers, and wherein the processor is further to use a software-accessible way control register to specify which mask to use during cache as RAM read and write operations.

18. The method of claim 16, wherein the processor is to enter the no-eviction mode by setting a NO_EVICT_MODE field of a model-specific register (MSR).

19. The method of claim 16, wherein a size of the code region is larger than a total size of the O ways, and a size of the data stack is limited to a total size of the P ways.

20. The method of claim 19, further comprising the processor, after executing the BIOS program, enabling eviction of all cache ways.

* * * * *